US011495070B2

(12) United States Patent
Caroselli et al.

(10) Patent No.: US 11,495,070 B2
(45) Date of Patent: Nov. 8, 2022

(54) METHOD AND SYSTEM FOR PROVIDING ACCESS CONTROL

(71) Applicant: Orion Entrance Control, Inc., Laconia, NH (US)

(72) Inventors: Stephen Edward Caroselli, Laconia, NH (US); David John Perotti, Modesto, CA (US); Michael Anthony Johnson, San Dimas, CA (US); Daniel Kent, Sanford, FL (US); Frederic Katz, Greensboro, NC (US); Luis Valle Rhor, Charlotte, NC (US)

(73) Assignee: Orion Entrance Control, Inc., Laconia, NH (US)

( * ) Notice: Subject to any disclaimer, the term of this patent is extended or adjusted under 35 U.S.C. 154(b) by 3 days.

(21) Appl. No.: 17/016,862

(22) Filed: Sep. 10, 2020

(65) Prior Publication Data

US 2021/0074099 A1    Mar. 11, 2021

Related U.S. Application Data

(60) Provisional application No. 62/898,279, filed on Sep. 10, 2019.

(51) Int. Cl.
*G07C 9/00* (2020.01)
*G06V 10/25* (2022.01)
*G06V 20/13* (2022.01)

(52) U.S. Cl.
CPC ......... *G07C 9/00571* (2013.01); *G06V 10/25* (2022.01); *G06V 20/13* (2022.01); *G07C 9/00182* (2013.01); *G06T 2207/10028* (2013.01)

(58) Field of Classification Search
CPC ........... G07C 9/00571; G07C 9/00182; G07C 2209/64; G07C 9/15; G07C 9/27; G07C 9/38; G06K 9/0063; G06K 9/3233; G06K 9/00771; G06T 2207/10028
See application file for complete search history.

(56) References Cited

U.S. PATENT DOCUMENTS

| 2009/0167857 | A1* | 7/2009 | Matsuda | G07C 9/00 348/143 |
| 2016/0275766 | A1 | 9/2016 | Venetianer et al. | |
| 2017/0344832 | A1 | 11/2017 | Leung et al. | |
| 2018/0285653 | A1 | 10/2018 | Li et al. | |
| 2018/0315200 | A1 | 11/2018 | Davydov et al. | |
| 2020/0097758 | A1* | 3/2020 | Basso | G06K 9/6211 |
| 2020/0294266 | A1* | 9/2020 | Botonjic | G06K 9/627 |
| 2021/0074099 | A1* | 3/2021 | Caroselli | G06V 10/25 |

OTHER PUBLICATIONS

International Search Report and Written Opinion in International Patent Application No. PCT/US2020/050234 dated Jan. 7, 2021.

* cited by examiner

*Primary Examiner* — An T Nguyen
(74) *Attorney, Agent, or Firm* — Lando & Anastasi, LLP

(57) ABSTRACT

Techniques for providing access control are disclosed. The techniques include: receiving, by an access control system, point cloud data associated with a field of view of a sensor; based on the point cloud data, determining that an object is entering a physical zone of interest in the field of view; and determining, by the access control system, an access control result indicating that the object is authorized to access the physical zone of interest or is not authorized to access the physical zone of interest.

17 Claims, 17 Drawing Sheets

METHOD AND SYSTEM FOR PROVIDING ACCESS CONTROL

RELATED APPLICATIONS

This application claims priority under 35 USC § 119(e) to U.S. Provisional Patent Application Ser. No. 62/898,279, titled "METHOD AND SYSTEM FOR PROVIDING ACCESS CONTROL," filed Sep. 10, 2019, which is hereby incorporated by reference.

BACKGROUND

A secured area is a physical space for which measures have been taken to prevent unauthorized entities (e.g., people, animals, robots, etc.) from entering unencumbered. Access control refers to a range of techniques used to seek to prevent unauthorized entries to a secured area. For example, access control techniques may include raising an alarm when an unauthorized entry is suspected. Nuisance alarms are false positives (i.e., alarms that do not actually correspond to an unauthorized entry) generated with such reoccurring frequency as to be ignored by supervisory personnel (i.e., security personnel operating on-site or at a remote location). Access control systems that generate too many nuisance alarms are effectively inoperable and tend to be taken out of service, at considerable cost to the end user.

Some forms of access control are more challenging than others. For example, the security industry as a whole has struggled to find reliable and cost-effective ways of successfully detecting tailgating/piggybacking (i.e., an unauthorized entry that takes advantage of an authorized entry, such as during the short time when a door remains unlocked). Prior attempts to address piggybacking include: security revolving doors with sensors in the ceilings to detect multiple persons; booths or rooms designed to sense the presence of multiple persons using a variety of infrared detection and weight sensors; video analytics that capture images and require extensive computing resources to process those images; and systems that require mounting hardware on the non-door swing side of door frames, which rely on infrared light and are only able to be used on specific types of doors.

In general, access control systems tend to be expensive to install and maintain, are unable to adapt fluidly to the installed environment, can operate only in a very limited range of building construction environments, and produce an unacceptably high amount of nuisance alarms.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to access control in secured areas.

SUMMARY

One or more embodiments include techniques for providing access control, including identifying intrusions (i.e., unauthorized entries and/or exits) and/or suspected intrusions.

In general, in one aspect, one or more non-transitory computer-readable media store instructions that, when executed by one or more processors, cause the one or more processors to perform operations including: receiving, by an access control system, one or more messages including light detection and ranging (LIDAR) data associated with a physical zone; based at least on the one or more messages: detecting, by the access control system, an object entering the physical zone; and determining, by the access control system, an access control result indicating that the object is authorized to access the physical zone or is not authorized to access the physical zone.

In general, in one aspect, one or more non-transitory computer-readable media store instructions that, when executed by one or more processors, cause the one or more processors to perform operations including: receiving, by an access control system, point cloud data associated with a field of view of a sensor; based on the point cloud data, determining that an object is entering a physical zone of interest in the field of view; and determining, by the access control system, an access control result indicating that the object is authorized to access the physical zone of interest or is not authorized to access the physical zone of interest.

Determining that the object is entering the physical zone of interest may include: spatially segmenting an input search space into a plurality of two-dimensional voxels in a plane; determining one or more potential clusters in the plurality of two-dimensional voxels; and identifying a cluster corresponding to the object in the one or more potential clusters, based at least on a determination that the cluster satisfies a pixel count threshold.

The operations may further include determining, by the access control system, a type of the object entering the physical zone, wherein determining the access control result is based at least on the type of the object.

The operations may further include determining, by the access control system, a count of objects in the physical zone, wherein determining the access control result is based at least on the count of objects in the physical zone.

The operations may further include determining, by the access control system, that the object is crawling or is not crawling, wherein determining the access control result is based at least on whether the object is crawling or is not crawling.

The operations may further include determining, by the access control system, a rate of travel of the object, wherein determining the access control result is based at least on the rate of travel of the object.

The operations may further include generating, by the access control system based at least on the access control result, an access control alert corresponding to the access control result. The access control alert may include one or more of an alarm tone or feedback presented in a graphical user interface.

Determining the access control result may include determining whether the object is piggybacking or tailgating an authorized object.

The access control result may indicate that the object is not authorized to access the physical zone, and determining the access control result may include identifying a suspect condition in which the access control system does not detect that the object has been granted access to access the physical zone.

The access control system may include a LIDAR device and a control board, and the LIDAR device may be configured to transmit one or more messages including LIDAR data to the control board.

The physical zone may be one of multiple physical zones monitored by the access control system.

One or more messages including LIDAR data may indicate one or more of a sensor specification, a timestamp, a number of objects tracked, an object identifier, an object type, a zone status, a zone edge event, an object velocity, an object position, and/or an object size. The object velocity may be a triple indicating velocity along three physical axes. The object size may be a triple indicating dimensions along three physical axes.

One or more messages may include a message split into multiple message packets. The message packets may include a first message packet storing data associated with the object entering the physical zone and a second message packet storing data associated with another object.

The access control system may be configured to determine whether the object is one or more of an adult-height person, a child-height person, a person carrying an item, a person wearing a hat, a person pulling or pushing an item, a plurality of people in close proximity, a non-human animal, an occupied wheelchair, an unoccupied wheelchair, an umbrella, a person on another person's back, and/or a person crawling.

The physical zone may correspond to a three-dimensional box within a field of view of one or more LIDAR sensors.

In general, in one aspect, a system includes at least one device including a hardware processor. The system is configured to perform operations including: receiving, by an access control system, one or more messages including light detection and ranging (LIDAR) data associated with a physical zone; based at least on the one or more messages: detecting, by the access control system, an object entering the physical zone; and determining, by the access control system, an access control result indicating that the object is authorized to access the physical zone or is not authorized to access the physical zone.

In general, in one aspect, a system includes at least one device including a hardware processor. The system is configured to perform operations including: receiving, by an access control system, point cloud data associated with a field of view of a sensor; based on the point cloud data, determining that an object is entering a physical zone of interest in the field of view; and determining, by the access control system, an access control result indicating that the object is authorized to access the physical zone of interest or is not authorized to access the physical zone of interest.

Determining that the object is entering the physical zone of interest may include: spatially segmenting an input search space into a plurality of two-dimensional voxels in a plane; determining one or more potential clusters in the plurality of two-dimensional voxels; and identifying a cluster corresponding to the object in the one or more potential clusters, based at least on a determination that the cluster satisfies a pixel count threshold. The operations may further include determining, by the access control system, a type of the object entering the physical zone, wherein determining the access control result is based at least on the type of the object.

The operations may further include determining, by the access control system, a count of objects in the physical zone, wherein determining the access control result is based at least on the count of objects in the physical zone.

The operations may further include determining, by the access control system, that the object is crawling or is not crawling, wherein determining the access control result is based at least on whether the object is crawling or is not crawling.

The operations may further include determining, by the access control system, a rate of travel of the object, wherein determining the access control result is based at least on the rate of travel of the object.

The operations may further include generating, by the access control system based at least on the access control result, an access control alert corresponding to the access control result. The access control alert may include one or more of an alarm tone or feedback presented in a graphical user interface.

Determining the access control result may include determining whether the object is piggybacking or tailgating an authorized object.

The access control result may indicate that the object is not authorized to access the physical zone, and determining the access control result may include identifying a suspect condition in which the access control system does not detect that the object has been granted access to access the physical zone.

The access control system may include a LIDAR device and a control board, and the LIDAR device may be configured to transmit one or more messages including LIDAR data to the control board.

The physical zone may be one of multiple physical zones monitored by the access control system.

One or more messages including LIDAR data may indicate one or more of a sensor specification, a timestamp, a number of objects tracked, an object identifier, an object type, a zone status, a zone edge event, an object velocity, an object position, and/or an object size. The object velocity may be a triple indicating velocity along three physical axes. The object size may be a triple indicating dimensions along three physical axes.

One or more messages may include a message split into multiple message packets. The message packets may include a first message packet storing data associated with the object entering the physical zone and a second message packet storing data associated with another object.

The access control system may be configured to determine whether the object is one or more of an adult-height person, a child-height person, a person carrying an item, a person wearing a hat, a person pulling or pushing an item, a plurality of people in close proximity, a non-human animal, an occupied wheelchair, an unoccupied wheelchair, an umbrella, a person on another person's back, and/or a person crawling.

The physical zone may correspond to a three-dimensional box within a field of view of one or more LIDAR sensors.

In general, in one aspect, a method includes: receiving, by an access control system, one or more messages including light detection and ranging (LIDAR) data associated with a physical zone; based at least on the one or more messages: detecting, by the access control system, an object entering the physical zone; and determining, by the access control system, an access control result indicating that the object is authorized to access the physical zone or is not authorized to access the physical zone.

In general, in one aspect, a method includes: receiving, by an access control system, point cloud data associated with a field of view of a sensor; based on the point cloud data, determining that an object is entering a physical zone of interest in the field of view; and determining, by the access control system, an access control result indicating that the object is authorized to access the physical zone of interest or is not authorized to access the physical zone of interest.

Determining that the object is entering the physical zone of interest may include: spatially segmenting an input search space into a plurality of two-dimensional voxels in a plane; determining one or more potential clusters in the plurality of two-dimensional voxels; and identifying a cluster corresponding to the object in the one or more potential clusters, based at least on a determination that the cluster satisfies a pixel count threshold.

The method may further include determining, by the access control system, a type of the object entering the physical zone, wherein determining the access control result is based at least on the type of the object.

The method may further include determining, by the access control system, a count of objects in the physical zone, wherein determining the access control result is based at least on the count of objects in the physical zone.

The method may further include determining, by the access control system, that the object is crawling or is not crawling, wherein determining the access control result is based at least on whether the object is crawling or is not crawling.

The method may further include determining, by the access control system, a rate of travel of the object, wherein determining the access control result is based at least on the rate of travel of the object.

The method may further include generating, by the access control system based at least on the access control result, an access control alert corresponding to the access control result. The access control alert may include one or more of an alarm tone or feedback presented in a graphical user interface.

Determining the access control result may include determining whether the object is piggybacking or tailgating an authorized object.

The access control result may indicate that the object is not authorized to access the physical zone, and determining the access control result may include identifying a suspect condition in which the access control system does not detect that the object has been granted access to access the physical zone.

The access control system may include a LIDAR device and a control board, and the LIDAR device may be configured to transmit one or more messages including LIDAR data to the control board.

The physical zone may be one of multiple physical zones monitored by the access control system.

One or more messages including LIDAR data may indicate one or more of a sensor specification, a timestamp, a number of objects tracked, an object identifier, an object type, a zone status, a zone edge event, an object velocity, an object position, and/or an object size. The object velocity may be a triple indicating velocity along three physical axes. The object size may be a triple indicating dimensions along three physical axes.

One or more messages may include a message split into multiple message packets. The message packets may include a first message packet storing data associated with the object entering the physical zone and a second message packet storing data associated with another object.

The access control system may be configured to determine whether the object is one or more of an adult-height person, a child-height person, a person carrying an item, a person wearing a hat, a person pulling or pushing an item, a plurality of people in close proximity, a non-human animal, an occupied wheelchair, an unoccupied wheelchair, an umbrella, a person on another person's back, and/or a person crawling.

The physical zone may correspond to a three-dimensional box within a field of view of one or more LIDAR sensors.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

1. System Architecture

Figure 1:
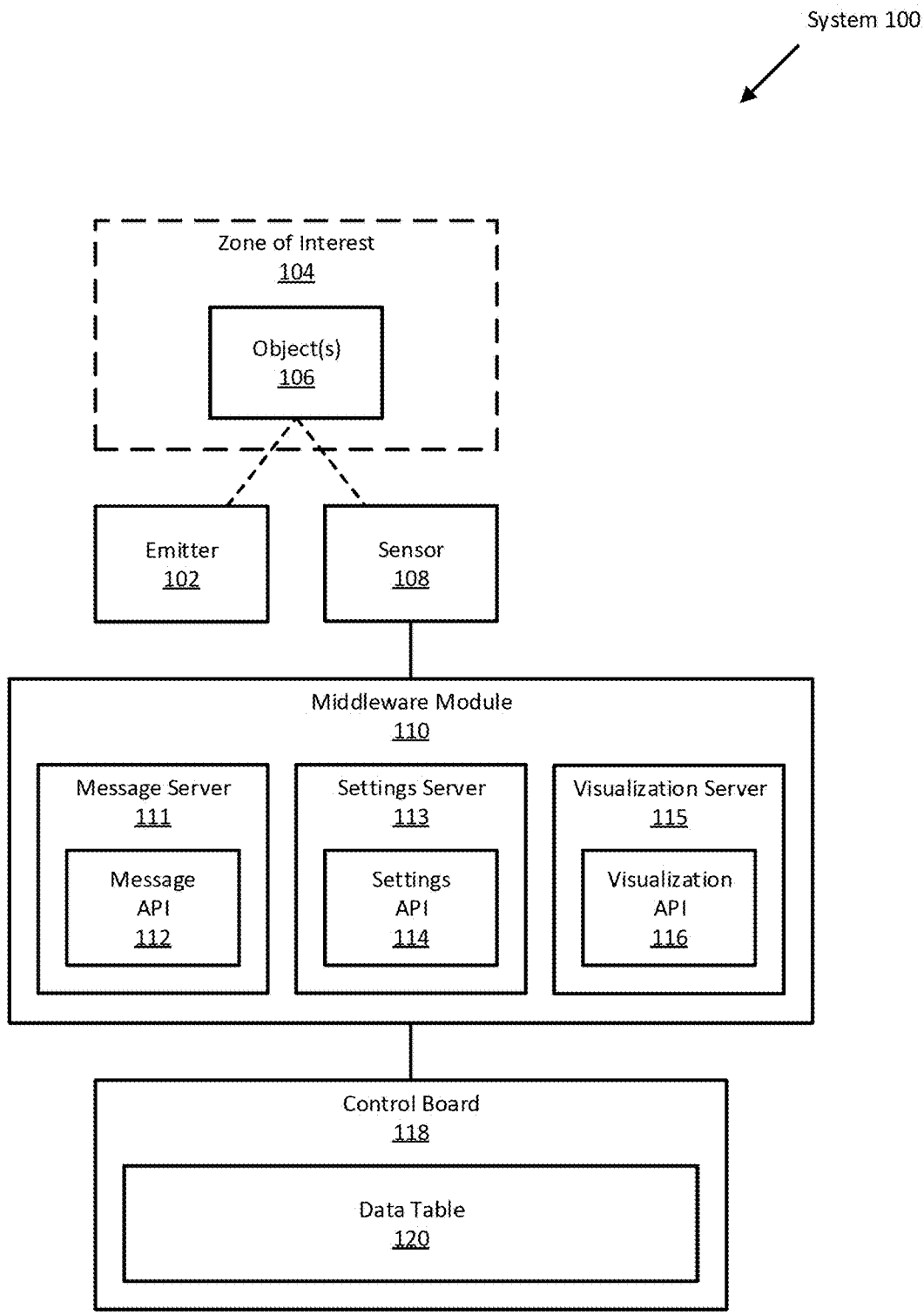
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the system 100 is configured to detect one or more object(s) 106 in a zone of interest 104. The zone of interest 104 is a particular physical area that the system 100 monitors for unauthorized access. The zone of interest 104 may be smaller than the totality of the secured area. For example, the zone of interest 104 may be an area near a doorway, turnstile, gate, or other entry/exit point sought to be secured. The zone of interest 104 may be user-configurable. For example, a user may be able to define the zone of interest 104 as a three-dimensional orthotope that is less than or equal to the field of view. In some examples described herein, the zone of interest 104 is also referred to as "Zone 1." If there are other zones of interest for which the system 100 is configured to provide access control, they may be referred to as "Zone 2," "Zone 3," etc.

In the examples described herein, the system 100 uses Light Detection and Ranging (LiDAR) technology to detect the object(s) 106. Alternatively or additionally, an object detection technology other than LiDAR may be used. LiDAR utilizes non-visible light to measure distance. Specifically, an emitter 102 is configured to generate non-visible light, which travels out and is reflected off one or more object(s) 106 to a sensor 208. The distance to an object 106 is calculated by measuring the non-visible light's Time of Flight (ToF), i.e., the time it takes the light to be emitted from the emitter 102, encounter the object 106, and return to the sensor 108.

The system 100 may use pulse LiDAR. Pulse LiDAR generates a specified number of non-visible points or beams of laser light. As each beam encounters an obstacle and reflects back, the light is collected into a specific receiver associated with that beam. Pulse LiDAR may be well-suited, for example, to environments having a taller installation height (e.g., above four meters or another threshold height, above which pulse LiDAR may provide better results).

Alternatively or additionally, the system 100 may use flash LiDAR. Flash LiDAR generates a flash of non-visible light that illuminates the scene in front of the sensor 108. That light is collected into a camera, which measures the time it took the individual camera pixels to receive the reflected light. Flash LiDAR may be well-suited, for example, to environments having a shorter installation height (e.g., up to four meters or another threshold height, up to which flash LiDAR may provide better results).

In an embodiment, the sensor 108 is configured to detect one or more object(s) 106 using LiDAR ToF technology (and/or another object detection technology). Responsive to detecting an object 106, the sensor 108 is configured to use algorithms and machine learning, described in further detail below, to track the object 106. During the tracking process, the sensor 108 generates object data (e.g., in the form of string data, which may also be referred to as "sentences," and/or point cloud data) that indicates the location and/or other information about the object 106, in the context of the zone of interest 104. For example, the object data may include information about (1) whether an object has entered or exited the zone of interest 104, and (2) at which edge of the zone of interest 104 the object entered/exited.

Detection, tracking, and classification of entities in the zone of interest 104 may be performed using three-dimensional (3D) point cloud data. The sensor 108 may be a 3D sensor configured to receive data corresponding to a dense collection of points in space, referred to herein as a "point cloud" or "3D point cloud." The sensor 108 may be configured to algorithmically transform the point cloud into a world-centric coordinate system (e.g., according to logical X-, Y-, and Z-axes). The sensor 108 may use a specialized clustering algorithm to segment entities (e.g., people and objects) from the background image. These clusters are collections of points corresponding to suspected people and/or other entities. The system 100 may use a machine learning neural network (not shown) to analyze the point cloud clusters and classify each cluster. For example, a cluster may be classified as a single person, two or more people, or another kind of object. Clusters identified as multiple people may be further split into smaller clusters that represent individual people. A tracking algorithm may track clusters from image to image, to identify and track individuals. Position and velocity information may be extracted from each cluster. The position and velocity information may be used to track the occupancy of the zone of interest 104 and detect entrance and/or exit events for the zone of interest 104.

Continuing with discussion of FIG. 1, the sensor 108 may provide the object data to a control board 118. The control board 118 may be configured to determine an appropriate response based on the object data. For example, the control board 118 may be configured to compare the object data with data previously stored in a data table 120 and update the data table 120 as needed. Specifically, in some embodiments described herein, the control board 118 uses techniques described below in FIGS. 3A-3C to determine an appropriate response.

In some examples, the control board 118 does not have sufficient processing power to fully process the object data. For example, if the object data includes raw point cloud data, the control board 118 may not have sufficient processing power to fully process the raw point cloud data. In one or more embodiments, the system 100 includes a middleware module 110 configured to perform preprocessing of the object data, to offload processing from the control board 118. Specifically, preprocessing object data may include converting the object data to a format that can be consumed by the control board 118. The middleware module 110 may be part of LiDAR equipment and/or one or more stand-alone devices (e.g., a deployable module that is physically separate from other components of the system 100). In the discussion herein, references to the middleware module 110 may apply instead to a sensor 108 that has corresponding built-in functionality.

To interact with other components of the system 100, the middleware module 110 may include one or more servers, accessible via one or more application programming interfaces (API's). The server(s) may include a Transmission Control Protocol/Internet Protocol (TCP/IP) server, a User Datagram Protocol (UDP) server, and/or another kind of server. In one embodiment, the middleware module 110 includes three servers: a message server 111 that provides a message API 112; a settings server 113 that provides a settings API 114; and a visualization server 115 that provides a visualization API 116. Other embodiments may include more or fewer servers and/or API's.

If the middleware functionality is built into the sensor 108, it may be configurable using one or more external files. For example, a single external file may be used to set system parameters, which may be concise and designed to be readily comprehensible to a lay person. If the middleware functionality is not built into the sensor 108 (i.e., the system 100 includes a middleware module 110 that is physically external to the sensor 108), it may be compiled down to one or more sets of executable code. The executable code may not have any dependencies that need to be added manually at time of commissioning the middleware. The executable code may be configured so that it self-starts when the middleware is booted up. Alternatively, an external middleware module 110 may be configurable using one or more external files. For example, a single external file may be used to set system parameters, which may be concise and designed to be readily comprehensible to a lay person. In general, the middleware may be configured to be accessible and commissionable by unskilled technicians. The system 100 may be designed to be as "plug-and-play" as possible, e.g., by not requiring any settings to be changed unless the system 100 is deployed outside of specified standard use cases. Some examples of standard use cases, according to one or more embodiments, are described below.

The message server 111 may be configured to listen for connections over one or more particular ports (e.g., port 5152 and/or one or more other ports). The control board 118 may act as a client to the message server 111. The control board 118 may attempt to establish a connection (e.g., a TCP/IP connection) with the message server 111 at startup. Using the message API 112, the message server 111 is responsible for updating the control board 118 with the specifically formatted object data (e.g., LiDAR data packets). An example of a data format for such messages, according to one or more embodiments, is described below.

The message API 112 may be configured to stream formatted object data to the control board 118 (for example, at a streaming rate of 10 to 30 times per second). The message API 112 may be a one-way communication channel to the control board 118. That is, the control board 118 may listen for message packets from the message API 112, without responding in any way. If the connection is dropped, the control board 118 may be configured to attempt to reconnect to the message server 111. The message server 111 may be configured to be available to accept a new connection from a given control board 118, regardless of the reason(s) for the dropped connection.

The message server 111 may be configured to accept multiple simultaneous connections (for example, up to five connections), so that one or more other devices can monitor the object data being streamed out by the middleware module 110. For example, the message server 111 may be configured to accept a connection from a personal computer, mobile device, and/or other kind of device that includes a user interface (not shown) that permits an administrator to view information about the streaming data.

The settings server 113 may be configured to listen for connections over one or more particular ports (e.g., port 5153 and/or one or more other ports). The settings API 114 may be used as a two-way communications channel for reading settings/parameters out of the middleware module 110 and/or writing settings/parameters to the middleware module 110. As described above with respect to the message server 111, the settings server 113 may be configured to accept multiple simultaneous connections.

The visualization server 115 is configured to provide visual data for the field of view, via the visualization API 116 (which may also be referred to as a point cloud API). The visual data may include live and/or recorded video, photograph snapshots, a heat map, point cloud data, and/or another kind of visual data or combination thereof. The visualization server 115 may stream the visual data to one or more connected devices (for example, at a rate of at least one frame per second). Streaming the visual data may help a user of the connected device to visualize the field of view in a format that is understandable to humans.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

2. Zone Configuration

Figure 2:
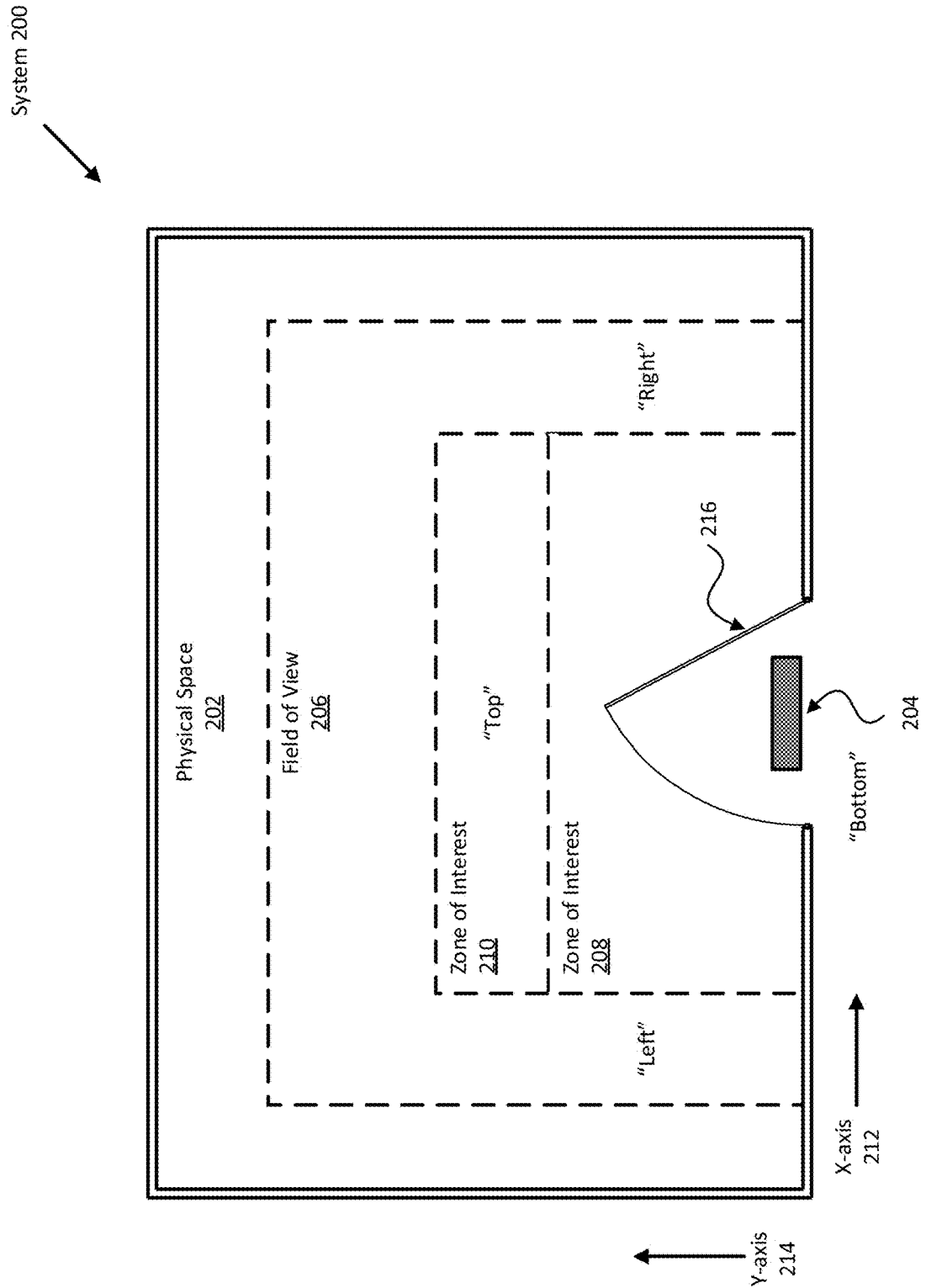
FIG. 2 is a block diagram of an example of a system according to an embodiment.

FIG. 2 is a block diagram of an example of a system 200 according to an embodiment. In an embodiment, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

As illustrated in FIG. 2, an access control system is installed in a physical space 202, to provide access control at an entry/exit door 216. Object detection hardware 204 (in this example, a LiDAR emitter and sensor) is installed at a boundary of a zone of interest 210, which is a three-dimensional orthotope within the LiDAR hardware's field of view 206. In this example, two abutting zones of interest 208, 210 are defined within the field of view 206. The object detection hardware 204 is configured to locate objects with reference to a logical x-axis 212 (corresponding to one dimension of a zone of interest) and a logical y-axis 214 (corresponding to another dimension of the zone of interest, orthogonal to the x-axis 212). The object detection hardware 204 may also be configured to locate object with reference to a logical z-axis (not shown), corresponding to a vertical height of the object. Areas around a particular zone of interest (e.g., zone of interest 208) may be conceptualized as "top," "bottom," "left," and "right." Those terms (or other terms having similar logical significance) may correspond to the different edges of the zone of interest 208 at which an object may enter or exit.

As illustrated in FIG. 2, the object detection hardware 204 is installed very close to the door jamb of the door 216, vertically above the door (i.e., looking "down" into the physical space). One edge is very close to touching/overlapping the stationary wall in which the door 216 is installed. Thus, in this example, when the door 216 opens, it swings into the zone of interest 208. One or more embodiments described herein are configured to ignore door swings and not track them.

3. Use Cases and Operating Conditions

One or more embodiments described herein are configured to provide access control in a range of use cases and operating conditions. Those use cases and operating conditions may include, but are not limited to, one or more of the following. The following use cases are provided as examples only and should not be construed as limiting one or more embodiments.

In general, one or more embodiments one or more embodiments are capable of providing access control in a variety of scenarios, which may include but are not limited to:

A. Passage detection in a confined space, including tailgating/piggybacking. Tailgating/piggybacking may be detectable in the following configurations: belly-to-back (e.g., at a distance of 0.0" or greater within the detection zone); shoulder-to-shoulder (e.g., at a distance of 0.0" or greater within the detection zone); and/or crawling behind an authorized user within the detection zone.

B. Intrusions, i.e., accessing a defined space without authorization by any means of mobility within the detection zone.

In general, one or more embodiments include one or more of the following object tracking features: counting all human objects that enter and/or exit a defined space; detecting and determining human object intent to enter or exit a defined space; and/or detecting door props, i.e., when a door in the detection zone is being held open for a pre-defined length of time.

In general, one or more embodiments include one or more of the following operational parameters: ambient light immunity, i.e., capability of object detection and tracking without interference from any sources of ambient lighting (e.g., including a full spectrum artificial and full sunlight); immunity to door leaves swinging into and out of the detection zone; learning new object profiles and pattern recognition to increase system effectiveness and reduce nuisance alarms; algorithms for activity detection, identification, and categorization; and communication with other systems and/or components, including but not limited to Orion Infinity Lane Control Software (IRLC).

In general, one or more embodiments include one or more of the following features: diagnostic tools; access one or more components via Wi-Fi, Bluetooth, and/or other wireless technology; granting access into a defined space; configuring device parameters and settings; configurable audible and visual signals associated with device; generating an occupancy report for a defined space; learning the background image to report changes in scenery; and/or learning the background image to eliminate noise in the scene via algorithmic analysis.

One or more embodiments support a range of egresses, including but not limited to: single doors (e.g., 3 feet wide); double doors (e.g., 6 feet wide); and hallways (e.g., 8 feet wide).

One or more embodiments are configured to detect simultaneous tailgating, including but not limited to: belly-to-back (touching or not touching); side-by-side (shoulder/arms touching or not touching); and crawling (on belly or hands and knees).

One or more embodiments are configured to detect simultaneous intrusion, including but not limited to unauthorized entry/exit in the form of: walking; running; or crawling (on belly or on hands and knees).

One or more embodiments are configured to monitor throughput up to a large number of simultaneous objects (e.g., tracking 10 or more objects) and may be configured to report a large number of transition events (e.g., at least 10 transition events per second).

One or more embodiments are configured to handle the presence of a door in the field of view gracefully, including but not limited to: one or more door leaves swinging into the field of view not affecting object detection; one or more door closers in the field of view not affecting object detection; and one or more door handles in the field of view not affecting object detection.

One or more embodiments described herein are configured to distinguish between different kinds of entities (e.g., using 3D point cloud data and machine learning techniques as described herein), including but not limited to: an adult-height person; a child-height person; a person carrying an object; a person wearing a hat; a person pushing or pulling an object (e.g., a stroller or rolling luggage such as a suitcase or laptop case); multiple people in close proximity to each other; a dog or other walking pet animal; a wheelchair occupied by a person; an empty wheelchair; an umbrella; one person piggybacking on another's back; a person crawling on knees or belly; and/or another kind of object or combination thereof.

The system (in particular, the sensor and middleware) may be configured to work correctly in a range of ambient lighting conditions (e.g., up to 120K lux) measured at the target surface at which the sensor is directed. The system may be configured to function correctly with all surfaces, regardless of color, material type, reflectivity, etc. As noted above, the system may be configured to completely ignore door swings, door closers, and door handles while maintaining accurate object detection. The system may be configured to detect and recognize a person between 3'0" and 6'7" tall. The system may be configured to detect if a person is crawling on their knees or belly. The system may be configured to detect when one person is riding on another person's back.

If the system is unable to make a positive recognition (e.g., classify a cluster as being a particular kind of object) but there is activity (e.g. movement or another change in imagery) that passes a threshold of suspicion, the system may generate a message that reports an object type of "unknown" to the control board. For example, depending on the system's sensitivity and configuration, it may report a dog weighing less than 40 pounds or an infant crawling into a zone of interest as an "unknown" object. Additional examples relating to "unknown" objects are described below.

If the system is able to make a positive recognition (e.g., classify a cluster as being a particular kind of object) and determines that the object is not a person, the system may generate a message that reports an object type of "other" to the control board. For example, depending on the system's sensitivity and configuration, it may report a dog weighing 40 pounds or more, a shopping cart, or a wheeled table as an "other" object. Additional examples relating to "other" objects are described below.

4. Message API and Packet Details

As noted above, middleware may be configured to communicate with a control board via a message API. In addition to the middleware, the control board may be configured to communicate with one or more other sensors. The message API may be configured so that the middleware (i.e., the sensor or a separate middleware module) is configured to stream formatted object data. For example, the streaming may be at regular intervals between 10-30 Hz. One or more embodiments are able to adjust this interval. The interval may not be tied directly to any events that may occur in the sensor's field of view. The middleware may be configured to compile a list of any events that may occur between updates, and report them to the control board on the next update. If no events are recorded or no objects are being tracked, the middleware may be configured to still send packets at regular intervals. This approach may serve as a "dead man" mechanism for the control board.

Individual elements of a given formatted data packet may be set in "key: value" pairs (for example, using JavaScript Object Notation (JSON) or another format). The control board may be configured to directly interpret the data. However, in some examples, the packet size accepted by the control board is limited (e.g., to under 1500 bytes per packet). One or more sensors that communicate with the control board may be configured to reduce packet size by removing "extra" characters such as tabs, the square brackets "[" and "]", line feeds, etc. Those characters may not be required by the control board, for example, if the control board is configured (e.g., using a JSON interpreter) to mainly look at key-value pairs or subsections denoted by the curly brackets "{" and "}". In addition, if there are enough entities in the field of view to cause the packet to exceed the packet size limit, the data may split into multiple packets. Multiple packets may be sent at a higher rate than the regularly scheduled update interval. An example of a multi-packet message is provided below.

In an embodiment, each message packet includes one or more of the following items of information:

A. Header
  a. Sensor hardware name. In an embodiment, this item is a string that includes a key-value pair, with a certain amount of space (e.g., 20 characters) allocated for the value. As one example:
    "senName": "TOF-777-A"
  b. Sensor hardware version. In an embodiment, this item is a string that includes a key-value pair, with a certain amount of space (e.g., 20 characters) allocated for the value. As two examples:
    "senHW": "1.03.77"
    "senHW": "2.30.AA1235p9"
  c. Sensor firmware/software version and/or middleware version. In an embodiment, this item is a string that includes a key-value pair, with a certain amount of space (e.g., 20 characters) allocated for the value. As two examples:
    "senFW": "3.12.65"
    "senFW": "1.23.AABBCC-1"
  d. Packet timestamp. In an embodiment, this item is a string that includes a key-value pair, with a certain amount of space (e.g., 20 characters) allocated for the value. Specifically, the timestamp may be in YYYYMMDDHHMMSSmmm format, using 19 characters. As one example:
    "tstamp": "20190722175834002"
In this example, the year (YY)=2019; month (MM)=07; day (DD)=22; hours (HH)=17; minutes (MM)=58; seconds (SS)=34; and milliseconds (mmm)=002.
  e. Number of objects tracked. In an embodiment, this item is a string that includes a key-value pair, with a certain amount of space (e.g., 5 characters) allocated for the value. As one example:
    "nObj": "2"

B. Exceptions.
  In an embodiment, an exception flag is a string that includes a key-value pair, with a certain amount of space (e.g., 20 characters) allocated for the key and a certain amount of space (e.g., 10 characters) allocated for the value. A set of "flags" may be represented as a number (e.g., a 32-bit number), where each bit position represents a given exception condition. As one example, bit positions may be assigned to exception conditions as follows:
    Position 0: Sensor blocked (possible attempt to defeat the sensor)
    Position 1: Sensor hardware fault
    Position 2: Sensor software fault/error
    Position 3: Object is "crawling" (e.g., based on Z-position and size)
    Positions 4-31: Reserved for future use
  Following this example, if the "sensor blocked" and "sensor hardware fault" flags are set, then the "value" field may be:
    Bit 0+Bit 1=($2^0$+$2^1$)=3
  Therefore, in this example, the exception string is:
    "exceptFlags": "3"

C. Objects.
  a. ID (identifier). In an embodiment, this item provides a unique identifier for a particular object that was detected. It may be a string that includes a key-value pair, with a certain amount of space (e.g., 5 characters) allocated for the value. As one example:
    "id": "1"
  b. Object type. In an embodiment, this item is a string that includes a key-value pair, where the value is one of a set of valid object types recognizable by the system (e.g., "Human", "Unknown", or "Other"). As one example:
    "objType": "Human"
  c. Zone status. In an embodiment, this item is a string that includes a key-value pair, with a certain amount of space (e.g., 150 characters) allocated for the value. Valid zone status descriptions may be classified, for example, as:
    ["Zx"] (when an object is in only one zone)
    ["Zx, Zy"] (when an object's location and size span more than one zone)
    "None" (when the object is in the field of view, but not in any zone)
  As some examples:
    "zoneStat": ["Z1"] (for an object in Zone 1)
    "zoneStat": ["Z1", "Z2"] (for an object that spans Zone 1 and Zone 2)
    "zoneStat": ["None"] (for an object that is in the field of view but no zone)
  d. Edge event. In an embodiment, this item is a string that includes a key-value pair, with a certain amount of space (e.g., 150 characters) allocated for the value. Along with the edge event value, additional attributes may be included that provide additional information to the control board about the event. For example, the attribute(s) "-Crawl" (indicating that the object is deemed to be a crawling human) and/or "-Suspect" (indicating an unknown object of high suspicion) may be included. For example, an umbrella over someone's head may be deemed as "suspect," indicating a possible act of collusion, whereas a small dog entering a zone of interest may not necessarily be deemed as "suspect." In an embodiment, possible edge event classifications include one or more of the following:

Enter A Top (since last update), where A is the zone number.

Enter A Bottom (since last update), where A is the zone number.

Enter A Right (since last update), where A is the zone number.

Enter A Left (since last update), where A is the zone number.

Exit A Top (since last update), where A is the zone number.

Exit A Bottom (since last update), where A is the zone number.

Exit A Right (since last update), where A is the zone number.

Exit A Left (since last update), where A is the zone number.

No edge events since last update

As some examples:
"edgeEvent": "Enter 1 Right"
"edgeEvent": "Enter 1 Right, Exit 2 Left"
"edgeEvent": "Enter 1 Right, Exit 1 Bottom-Crawl" (where one person entered Zone 1 on the right edge, while another person crawled out of Zone 1's bottom edge)
"edgeEvent": "Enter 1 Right-Suspect" (e.g., where an umbrella 6 feet off the ground entered zone 1 on the right edge.)
"edgeEvent": "n/a" (this object neither entered nor exited any zone since last update)

e. Velocity. In an embodiment, this item is a string that includes a key-value pair. The value may be limited to a certain precision (e.g., 3 places to the right of the decimal point). Positive X velocity may be in the direction from "left" to "right" along the X-axis of the field of view; the control board may invert the sign if necessary, for example, based on the door orientation. Positive Y velocity may be in the direction from "bottom" to "top" along the Y axis of the field of view; the control board may invert the sign if necessary, for example, based on the door orientation. As two examples:

"vel": ["1.234", "1.234", "1.234"]
"vel": ["1.23456789", "1.23456789", "1.23456789"]

f. Position. In an embodiment, this item is a string that includes a key-value pair. The value may be limited to a certain precision (e.g., 3 places to the right of the decimal point). The "X" position may be correspond to the "left" side of the object, relative to the "left" side of the field of view's X-axis; the control board may invert the sign if necessary, for example, based on door orientation). The "Y" direction may correspond to the "bottom" side of the object relative to the "bottom" of the field of view's Y-axis; the control board may invert the sign if necessary, for example, based on door orientation. The "Z" position may correspond to the side of the object furthest removed from the ground. As two examples:

"pos": ["1.234", "1.234", "1.234"]
"pos": ["1.23456789", "1.23456789", "1.23456789"]

g. Size. In an embodiment, this item is a string that includes a key-value pair. The value may be limited to a certain precision (e.g., 3 places to the right of the decimal point). As two examples:

"size": ["1.234", "1.234", "1.234"]
"size": ["1.23456789", "1.23456789", "1.23456789"]

The following is an example of two versions ("full" and "simple") of a complete packet. In this example, the zones are as illustrated in FIG. 2, with zone of interest 208 designated as "Zone 1" and zone of interest 210 designated as "Zone 2." This packet corresponds to a scenario where two persons entered since the last update: ID "1" at the "right" and ID "2" at the "top." No exception flags are set.

| Full Message | Simple Message (no spaces, <CR>, <LF> needed) |
|---|---|
| { <br>   "header": { <br>     "senName": "TOF-777-A", <br>     "senHW": "2.30.AA1235p9", <br>     "senFW": "1.23.AABBCC-1", <br>     "tstamp": "20190722175834002", <br>     "nObj": "2" <br>   }, <br>   "exceptions": { <br>     "exceptFlags": "0" <br>   }, <br>   "objects": [ <br>     { <br>       "id": "1", <br>       "objType": "Human", <br>       "zoneStat": ["Z1"], <br>       "edgeEvent": "Enter 1 Right", <br>       "vel": ["1.050", "2.200"], <br>       "pos": ["1.234","3.221","1.001"], <br>       "size": ["0.234", "0.05", "0.200"] <br>     }, <br>     { <br>       "id": "2", <br>       "objType": "Human", <br>       "zoneStat": ["Z1"], <br>       "edgeEvent": "Enter 1 Top", <br>       "vel": ["1.150", "2.290"], <br>       "pos": ["1.789","5.612","2.001"], <br>       "size": ["0.334", "0.09", "0.100"] <br>     } <br>   ] <br> } | "senName": "TOF-777-A", <br> "senHW": "2.30.AA1235p9", <br> "senFW": "1.23.AABBCC-1", <br> "tstamp": "20190722175834002", <br> "nObj": "2", <br> "exceptFlags": "0", <br> "id": "1", <br> "objType": "Human", <br> "zoneStat": ["Z1"], <br> "edgeEvent": "Enter 1 Right", <br> "vel": ["1.050", "2.200"], <br> "pos": ["1.234","3.221","1.001"], <br> "size": ["0.234", "0.05", "0.200"], <br> "id": "2", <br> "objType": "Human", <br> "zoneStat": ["Z1"], <br> "edgeEvent": "Enter 1 Top", <br> "vel": ["1.150", "2.290"], <br> "pos": ["1.789","5.612","2.001"], <br> "size": ["0.334", "0.09", "0.100"] |

In another example, no objects are detected in the field of view.

| Full Message | Simple Message (no spaces, <CR>, <LF> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175834045",<br>    "nObj": "0"<br>  },<br>  "exceptions": {<br>    "exceptFlags": "0"<br>  },<br>  "objects": [<br>  ]<br>} | "senName": "TOF-777-A",<br>"senHW": "2.30.AA1235p9",<br>"senFW": "1.23.AABBCC-1",<br>"tstamp": "20190722175834002",<br>"nObj": "0",<br>"exceptFlags": "0", |

Some additional examples of packets are discussed below.

5. Settings API and Query Structure

As noted above, in an embodiment, a settings API provides an interface for exchanging settings data between the control board and the sensor/middleware. Once a connection (e.g., a TCP/IP connection) has been established, commands may be issued to query either the sensor/middleware (acting in this example as a server) or a control board or other client.

The following is an example of a query that may be used to request a single parameter:

"Request": "name1"<cr>

The recipient may respond with the value of the requested parameter, for example, as follows:

"name1": "value"<cr>

Alternatively or additionally, the query structure may support requesting multiple parameters. For example:

"Request": "name1", "name2", "name3", "name4", "name5"<cr>

The recipient may respond with the values of the requested parameters, for example, as follows:

"name1": "value", "name2": "value", "name3": "value", "name4": "value", "name5": "value"<cr>

The following are some examples of settings/parameters according to an embodiment. In these examples, the expression "r/w" refers to "read/write," i.e., the value may be read and a new value may be written to the setting/parameter.

Time (r/w)
Date (r/w)
Number of Sensors used (r/w, in the case of sensor fusion)
Sensor(s) Hardware Version (read only)
Sensor(s) Firmware (read only, Firmware/Software version or external middleware version)
Sensor(s) Modulation Frequency (r/w)
Sensor(s) Frame Rate (r/w)
Sensor(s) Status (r/w)
Middleware version (read only, if not covered under Sensor Firmware)
Message API update interval (r/w)
Max packet size (r/w)
Sensor/Middleware Ip Address (r/w)
Zone vertices 2D/3D (r/w)
Point cloud masking vertices 2d/3d (r/w)
Exception codes/flags (r/w)
Mode/behavior/Algorithm selection (r/w)
Any filtering parameters (r/w)
Mounting Height (r/w)
Other

6. Access Control Flow

Figure 3A:
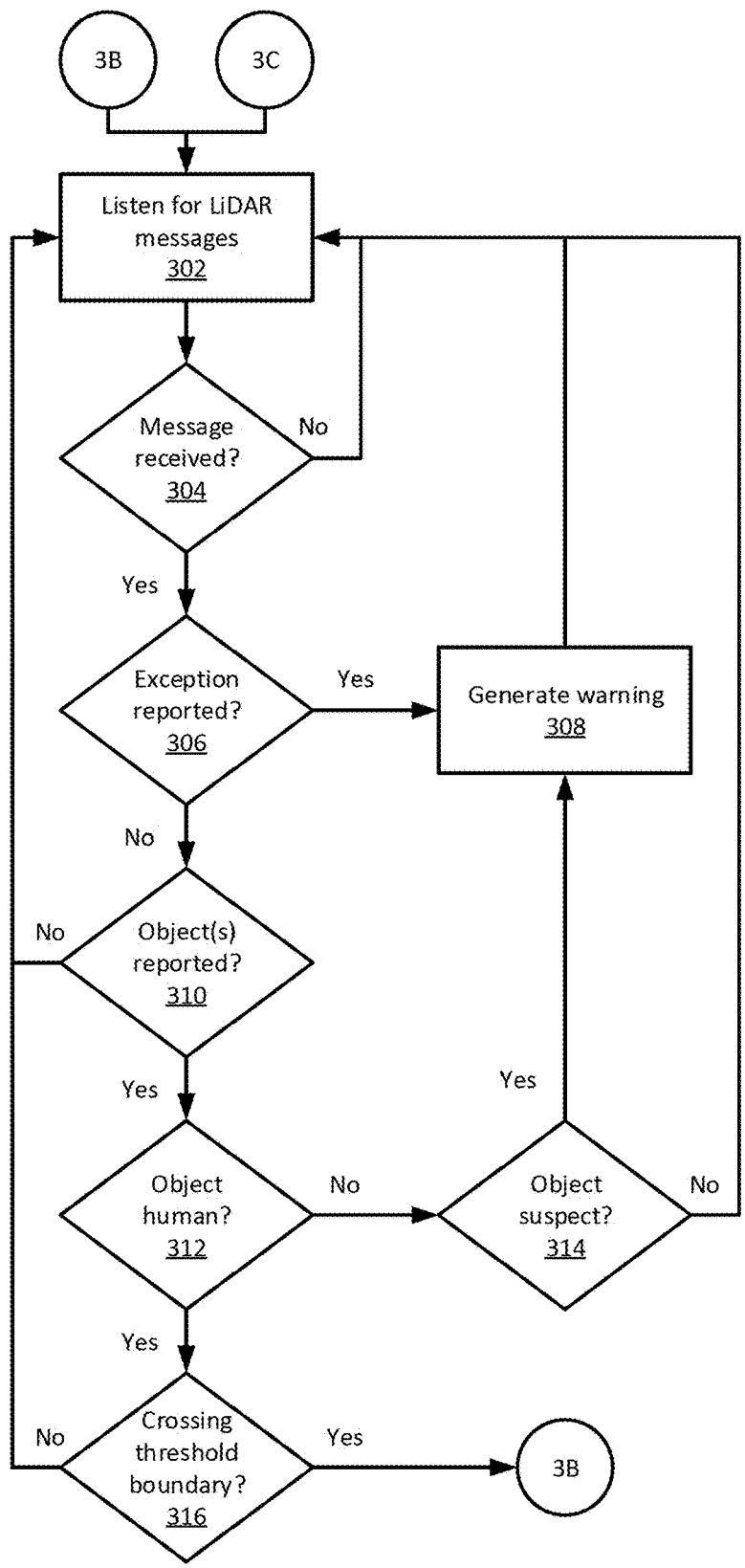
FIGS. 3A-3C are a flow diagram of an example of operations for providing access control according to an embodiment.
Figure 3B:
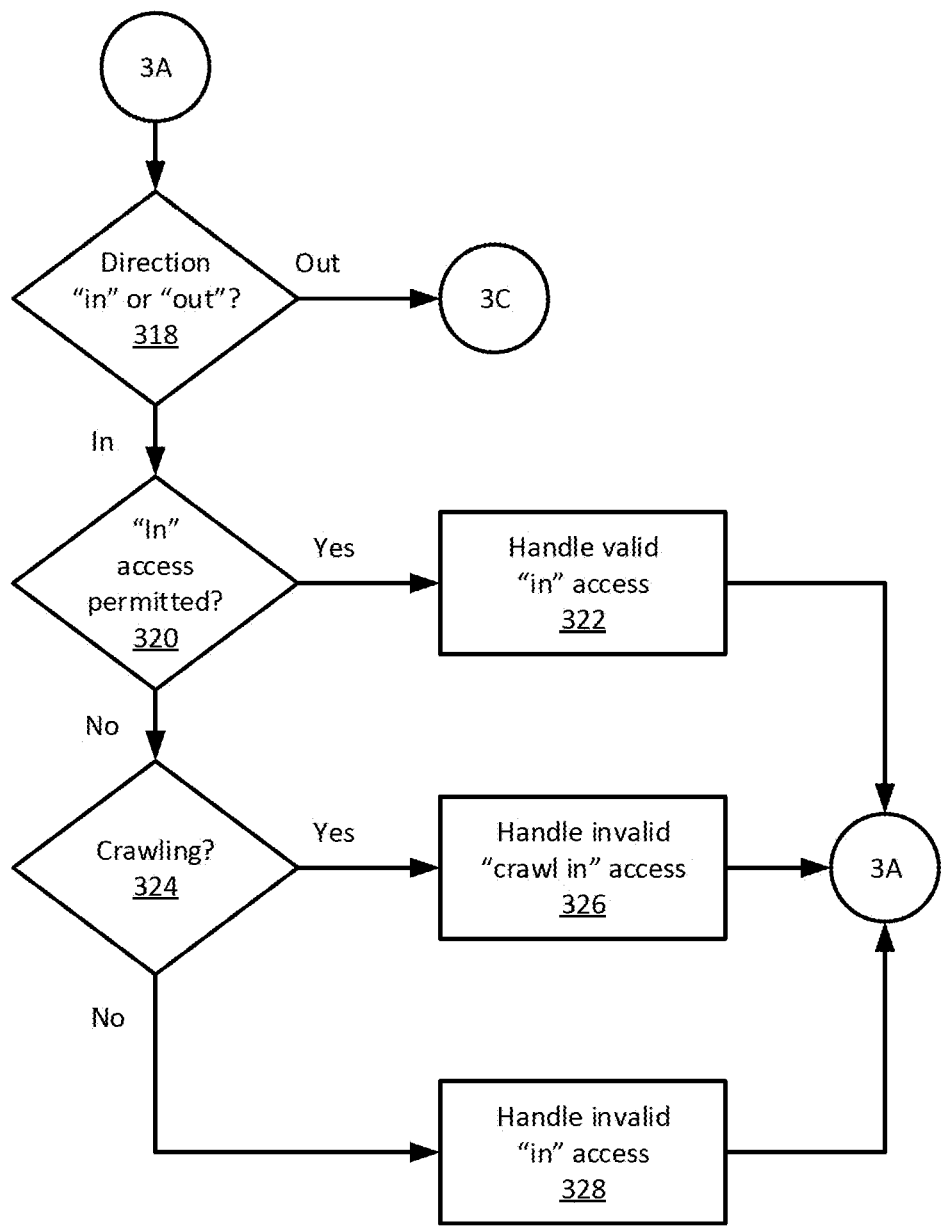
Figure 3C:
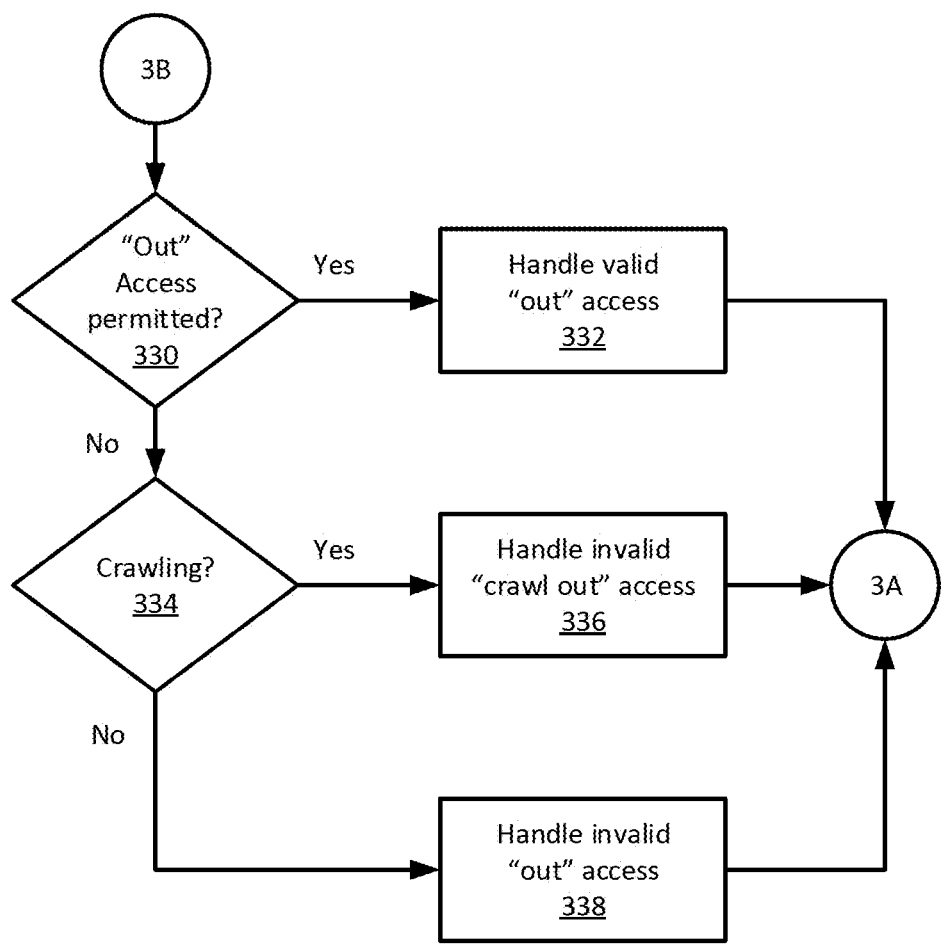

FIGS. 3A-3C are a flow diagram of an example of operations for providing access control according to an embodiment. One or more operations illustrated in FIGS. 3A-3C may be modified, rearranged, or omitted all together. Accordingly, the particular sequence of operations illustrated in FIGS. 3A-3C should not be construed as limiting the scope of one or more embodiments.

In an embodiment, a system (e.g., one or more components of the system 100 illustrated in FIG. 1) listens for LiDAR messages (Operation 302). In this discussion, references to LiDAR may alternatively apply to another kind of object detection technology. While listening for LiDAR messages, the system determines whether a message has been received (Decision 304). The system continues listening until a message has been received, and may continue listening even after a message has been received and is being processed.

Upon receiving a message, the system examines the message. The system may determine whether an exception is reported (Decision 306), such as one or more exceptions described above. If an exception is reported, then the system generates a warning (Operation 308). The warning may take many different forms. For example, the system may generate an audible warning tone, a visual warning (e.g., a flashing light), and/or another kind of sensory warning. The system may log the warning in a warning log. The system may display a message on a display, e.g., the display of a security monitoring system.

In an embodiment, the system determines whether the message indicates that any objects is/are reported (Decision 310). An object may be reported if it is in the LiDAR sensor's field of view and in a zone of interest. Alternatively, an object may be reported even if it is not in a zone of interest. If no object is reported, then no action is needed with respect to access control, because there is no object for which to grant or deny access.

If an object is reported, then the system may determine whether the message indicates that the object is human (Decision 312). If the object is not human, then the system may determine whether the object is suspect (Decision 314). If the object is suspect, then the system may generate a warning (Operation 308). If the object is not suspect, then no action is needed with respect to access control. Alternatively, in an embodiment, the system is also configured to grant or deny access to non-human objects (e.g., animals, drones, robots, etc.). One or more operations described herein with respect to granting or denying access to humans may also apply to one or more kinds of non-human objects.

In an embodiment, if the object is human (or another kind of object for which the system is configured to provide access control), then the system determines whether the message indicates that the object is crossing a threshold boundary (Decision 316). For example, an object may be crossing a threshold boundary when it passes from outside a zone to inside the zone, or from inside a zone to outside the zone. If the object is not crossing a threshold boundary, then no action is needed with respect to access control.

If the object is crossing a threshold boundary, then the system may determine whether the message indicates that the object is passing "in" or "out," i.e., into a zone of interest or out of a zone of interest (Decision 318). If the object is passing into the zone, then the system may determine whether "in" access is permitted (e.g., based on whether the object is an allowed kind of object, whether valid credentials have been presented, etc.) (Decision 320). If "in" access is permitted, then the system may handle the valid "in" access (Operation 322). Handling a valid "in" access may include incrementing a count of valid "in" accesses. In addition, the system may provide feedback indicating that the access is valid. For example, the system may generate an audible confirmation (e.g., a chime), a visual confirmation (e.g., a green light), and/or another kind of sensory confirmation that the access is valid. The system may display a message on a display, e.g., the display of a security monitoring system.

If "in" access is not permitted for the object, the system may determine whether the message indicates that the object is crawling (Decision 324). If the object is crawling, then the system may handle the invalid "crawl in" access (Operation 326). Handling the invalid "crawl in" access may include incrementing a count of invalid "crawl in" accesses. In addition, the system may generate a warning. The warning may take many different forms. For example, the system may generate an audible warning tone, a visual warning (e.g., a flashing light), and/or another kind of sensory warning. The system may log the warning in a warning log. The system may display a message on a display, e.g., the display of a security monitoring system.

If the object is not crawling, then the system may handle the invalid "in" access (Operation 328). Handling the invalid "in" access may include incrementing a count of invalid "in" accesses. In addition, the system may generate a warning. The warning may take many different forms. For example, the system may generate an audible warning tone, a visual warning (e.g., a flashing light), and/or another kind of sensory warning. The system may log the warning in a warning log. The system may display a message on a display, e.g., the display of a security monitoring system.

Returning to Decision 318, if the object is passing out of the zone, then the system may determine whether "out" access is permitted (e.g., based on whether the object is an allowed kind of object, whether valid credentials have been presented, etc.) (Decision 330). If "out" access is permitted, then the system may handle the valid "out" access (Operation 332). Handling a valid "out" access may include incrementing a count of valid "out" accesses. In addition, the system may provide feedback indicating that the access is valid. For example, the system may generate an audible confirmation (e.g., a chime), a visual confirmation (e.g., a green light), and/or another kind of sensory confirmation that the access is valid. The system may display a message on a display, e.g., the display of a security monitoring system.

If "out" access is not permitted for the object, the system may determine whether the message indicates that the object is crawling (Decision 334). If the object is crawling, then the system may handle the invalid "crawl out" access (Operation 336). Handling the invalid "crawl out" access may include incrementing a count of invalid "crawl out" accesses. In addition, the system may generate a warning. The warning may take many different forms. For example, the system may generate an audible warning tone, a visual warning (e.g., a flashing light), and/or another kind of sensory warning. The system may log the warning in a warning log. The system may display a message on a display, e.g., the display of a security monitoring system.

If the object is not crawling, then the system may handle the invalid "out" access (Operation 338). Handling the invalid "out" access may include incrementing a count of invalid "out" accesses. In addition, the system may generate a warning. The warning may take many different forms. For example, the system may generate an audible warning tone, a visual warning (e.g., a flashing light), and/or another kind of sensory warning. The system may log the warning in a warning log. The system may display a message on a display, e.g., the display of a security monitoring system.

In an embodiment, the system continues listening for messages and processing the messages to provide access control, as described above, until the system is disabled or encounters an error condition that prevents it from receiving and/or processing messages.

7. Additional Examples

Figure 4A:
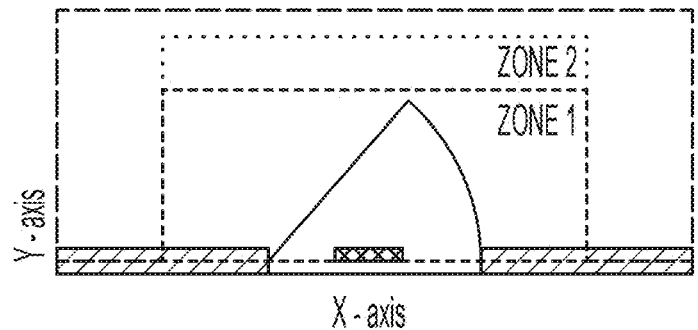
FIGS. 4A-4W illustrate examples according to an embodiment.

Detailed examples are described below for purposes of clarity. Specifically, FIGS. 4A-4W illustrate examples according to an embodiment. Components and/or operations described below should be understood as examples that may not be applicable to one or more embodiments. Accordingly, components and/or operations described below should not be construed as limiting the scope of one or more embodiments.

In these examples, message API packets correlate to the field of view over time "T", with an update rate of 10 Hz. Two versions of each message are shown: a "full" version and a "simple" version.

In FIG. 4A, the time is T=0 and there are no objects in the field of view.

| Full Message | Simple Message (no spaces, \<CR\>, \<LF\> needed) |
|---|---|
| { | "senName": "TOF-777-A", |
|   "header": { | "senHW": "2.30.AA1235p9", |
|     "senName": "TOF-777-A", | "senFW": "1.23.AABBCC-1", |
|     "senHW": "2.30.AA1235p9", | "tstamp": "20190722175834000", |
|     "senFW": "1.23.AABBCC-1", | "nObj": "0", |

| Full Message | Simple Message (no spaces, <CR>, <LF> needed) |
|---|---|
|     "tstamp": "20190722175834000",<br>    "nObj": "0"<br>  },<br>  "exceptions": {<br>    "exceptFlags": "0"<br>  },<br>  "objects": [<br>  ]<br>} | "exceptFlags": "0" |

Figure 4B:
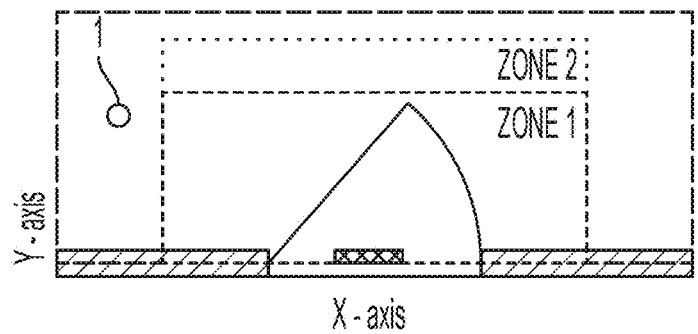

In FIG. 4B, the time is T+100 mS. Object "1" of type "Human" has entered the field of view but has not entered either zone of interest (i.e., Zone 1 or Zone 2), i.e., no edge events are recorded since the last update.

| Full Message | Simple Message (no spaces, <CR>, <LF> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175834100",<br>    "nObj": "1"<br>  },<br>  "exceptions": {<br>    "exceptFlags": "0"<br>  },<br>  "objects": [<br>    {<br>      "id": "1",<br>      "objType": "Human",<br>      "zoneStat": ["None"],<br>      "edgeEvent": "n/a",<br>      "vel": ["1.050", "−1.000"],<br>      "pos": ["1.234","3.221", "5.001"],<br>      "size": ["0.234", "0.05", "0.200"]<br>    }<br>  ]<br>} | "senName": "TOF-777-A",<br>"senHW": "2.30.AA1235p9",<br>"senFW": "1.23.AABBCC-1",<br>"tstamp": "20190722175834100",<br>"nObj": "1",<br>"exceptFlags": "0",<br>"id": "1",<br>"objType": "Human",<br>"zoneStat": ["None"],<br>"edgeEvent": "n/a",<br>"vel": ["1.050", "−1.000"],<br>"pos": ["1.234","3.221","5.001"],<br>"size": ["0.234", "0.05", "0.200"] |

Figure 4C:
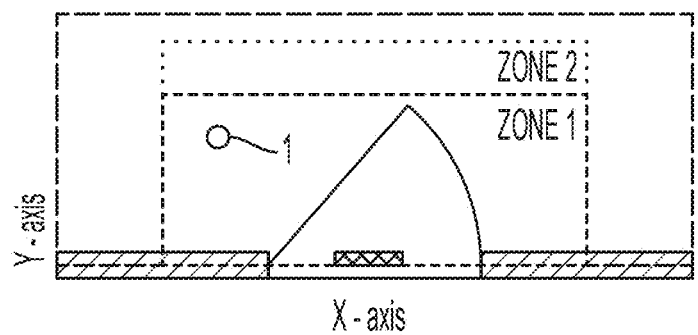

In FIG. 4C, the time is T+200 mS. An edge event indicates that object "1" entered Zone 1 at the "left."

| Full Message | Simple Message (no spaces, <CR>, <LF> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175834200",<br>    "nObj": "1"<br>  },<br>  "exceptions": {<br>    "exceptFlags": "0"<br>  },<br>  "objects": [<br>    {<br>      "id": "1",<br>      "objType": "Human",<br>      "zoneStat": ["Z1"],<br>      "edgeEvent": "Enter 1 Left", | "senName": "TOF-777-A",<br>"senHW": "2.30.AA1235p9",<br>"senFW": "1.23.AABBCC-1",<br>"tstamp": "20190722175834200",<br>"nObj": "1",<br>"exceptFlags": "0",<br>"id": "1",<br>"objType": "Human",<br>"zoneStat": ["Z1"],<br>"edgeEvent": "Enter 1 Left",<br>"vel": ["1.050","−0.500"],<br>"pos": ["3.234","2.221","5.001"],<br>"size": ["0.234","0.05","0.200"] |

| Full Message | Simple Message (no spaces, \<CR\>, \<LF\> needed) |
|---|---|
|        "vel": ["1.050", "−0.500"],<br>       "pos": ["3.234", "2.221", "5.001"],<br>       "size": ["0.234", "0.05", "0.200"]<br>     }<br>   ]<br>} | |

Figure 4D:
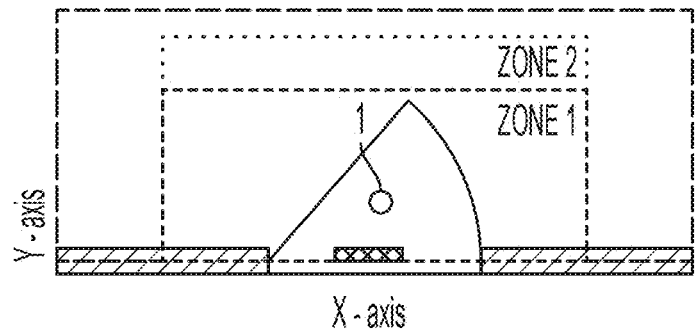

In FIG. 4D, the time is T+300 mS. Object "1" is still in Zone 1 and no edge events are recorded since the last update.

| Full Message | Simple Message (no spaces, \<CR\>, \<LF\> needed) |
|---|---|
| {<br>   "header": {<br>     "senName": "TOF-777-A",<br>     "senHW": "2.30.AA1235p9",<br>     "senFW": "1.23.AABBCC-1",<br>     "tstamp": "20190722175834300",<br>     "nObj": "1"<br>   },<br>   "exceptions": {<br>     "exceptFlags": "0"<br>   },<br>   "objects": [<br>     {<br>       "id": "1",<br>       "objType": "Human",<br>       "zoneStat": ["Z1"],<br>       "edgeEvent": "n/a",<br>       "vel": ["1.050", "−0.500"],<br>       "pos": ["4.234", "1.221", "5.001"],<br>       "size": ["0.234", "0.05", "0.200"]<br>     }<br>   ]<br>} | "senName": "TOF-777-A",<br>"senHW": "2.30.AA1235p9",<br>"senFW": "L23.AABBCC-1",<br>"tstamp": "20190722175834300",<br>"nObj": "1",<br>"exceptFlags": "0",<br>"id": "1",<br>"objType": "Human",<br>"zoneStat": ["Z1"],<br>"edgeEvent": "n/a",<br>"vel": ["1.050", "−0.500"],<br>"pos": ["4.234","1.221","5.001"],<br>"size": ["0.234","0.05","0.200"] |

Figure 4E:
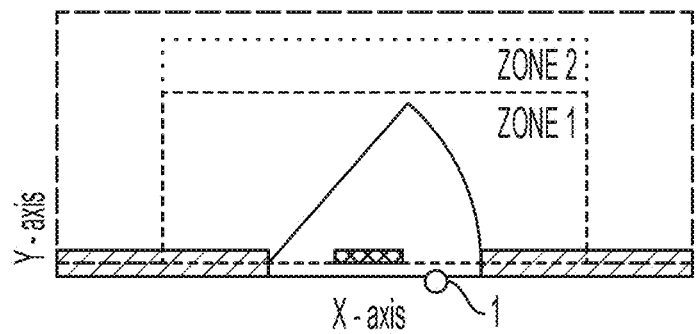

In FIG. 4E, the time is T+400 mS. An edge event indicates that object "1" exited Zone 1 at the "bottom."

| Full Message | Simple Message (no spaces, \<CR\>, \<LF\> needed) |
|---|---|
| {<br>   "header": {<br>     "senName": "TOF-777-A",<br>     "senHW": "2.30.AA1235p9",<br>     "senFW": "1.23.AABBCC-1",<br>     "tstamp": "20190722175834400",<br>     "nObj": "1"<br>   },<br>   "exceptions": {<br>     "exceptFlags": "0"<br>   },<br>   "objects": [<br>     {<br>       "id": "1",<br>       "objType": "Human",<br>       "zoneStat": ["None"],<br>       "edgeEvent": "Exit 1 Bottom",<br>       "vel": [".750", "−0.500"],<br>       "pos": ["0", "0", "0"],<br>       "size": ["0", "0", "0"]<br>     }<br>   ]<br>} | "senName": "TOF-777-A",<br>"senHW": "2.30.AA1235p9",<br>"senFW": "1.23.AABBCC-1",<br>"tstamp": "20190722175834400",<br>"nObj": "1",<br>"exceptFlags": "0",<br>"id": "1",<br>"objType": "Human",<br>"zoneStat": ["None"],<br>"edgeEvent": "Exit 1 Bottom",<br>"vel": [".750","−0.500"],<br>"pos": ["0", "0","0"],<br>"size": ["0", "0","0"] |

Figure 4F:
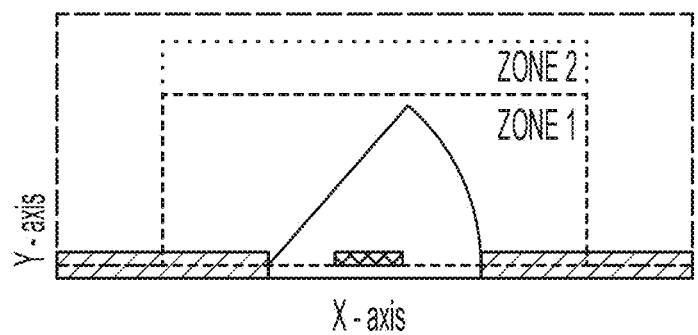

In FIG. 4F, the time is T+500 mS. Once again, there are no objects detected in the field of view ("nObj": "0").

| Full Message | Simple Message (no spaces, <CR>, <LF> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175834500",<br>    "nObj": "0"<br>  },<br>  "exceptions": {<br>    "exceptFlags": "0"<br>  },<br>  "objects": [<br>  ]<br>} | "senName": "TOF-777-A",<br>"senHW": "2.30.AA1235p9",<br>"senFW": "1.23.AABBCC-1",<br>"tstamp": "20190722175834500",<br>"nObj": "0",<br>"exceptFlags": "0" |

Figure 4G:
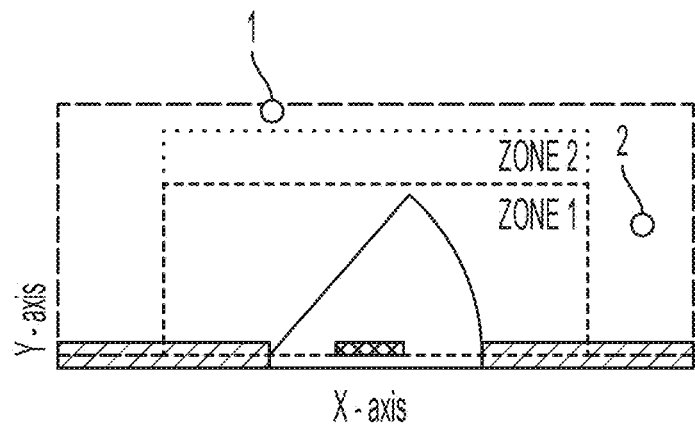

In FIG. 4G, the time is T+600 mS. Two objects of type "Human" have entered the field of view: object "1" and object "2." In this example, the object identifiers distinguish between objects that are in the field of view; object "1" here may not be the same object "1" from FIGS. 4B-4E. Alternatively, the system may use some kind of biometric identification or other technology to distinguish between objects, and assign each object its own unique identifier that persists even after the object leaves the field of view.

| Full Message | Simple Message (no spaces, <CR>, <LF> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175834600",<br>    "nObj": "2"<br>  },<br>  "exceptions": {<br>    "exceptFlags": "0"<br>  },<br>  "objects": [<br>    {<br>      "id": "1",<br>      "objType": "Human",<br>      "zoneStat": ["None"],<br>      "edgeEvent": "n/a",<br>      "vel": ["1.050", "-1.000"],<br>      "pos": ["1.234", "5.221", "5.001"],<br>      "size": ["0.234", "0.05", "0.200"]<br>    },<br>    {<br>      "id": "2",<br>      "objType": "Human",<br>      "zoneStat": ["None"],<br>      "edgeEvent": "n/a",<br>      "vel": ["-1.050", "-1.000"],<br>      "pos": ["5.234", "3.221", "5.001"],<br>      "size": ["0.234", "0.05", "0.200"]<br>    }<br>  ]<br>} | "senName": "TOF-777-A",<br>"senHW": "2.30.AA1235p9",<br>"senFW": "1.23.AABBCC-1",<br>"tstamp": "20190722175834600",<br>"nObj": "2",<br>"exceptFlags": "0",<br>"id": "1",<br>"objType": "Human",<br>"zoneStat": ["None"],<br>"edgeEvent": "n/a",<br>"vel": ["1.050","-1.000"],<br>"pos": ["1.234", "5.221","5.001"],<br>"size": ["0.234", "0.05","0.200"]"id": "2",<br>"objType": "Human",<br>"zoneStat": ["None"],<br>"edgeEvent": "n/a",<br>"vel": ["-1.050", "-1.000"],<br>"pos": ["5.234", "3.221", "5.001"],<br>"size": ["0.234", "0.05", "0.200"] |

Figure 4H:
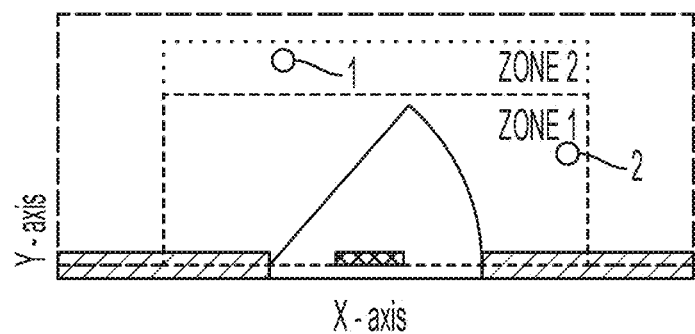

In FIG. 4H, the time is T+700 mS. Two edge events indicate that object "1" entered Zone 2 at the "top" and object "2" entered Zone 1 at the "right."

| Full Message | Simple Message (no spaces, <CR>, <LF> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175834700",<br>    "nObj": "2"<br>  },<br>  "exceptions": {<br>    "exceptFlags": "0"<br>  },<br>  "objects": [<br>    {<br>      "id": "1",<br>      "objType": "Human",<br>      "zoneStat": ["Z2"],<br>      "edgeEvent": "Enter 2 at Top",<br>      "vel": ["0.500", "−1.000"],<br>      "pos": ["1.754", "4.221", "5.001"],<br>      "size": ["0.234", "0.05", "0.200"]<br>    },<br>    {<br>      "id": "2",<br>      "objType": "Human",<br>      "zoneStat": ["Z1"],<br>      "edgeEvent": "Enter 1 Right",<br>      "vel": ["−1.050", "−0.250"],<br>      "pos": ["4.234", "3.000", "5.001"],<br>      "size": ["0.234", "0.05", "0.200"]<br>    }<br>  ]<br>} | "senName": "TOF-777-A",<br>"senHW": "2.30.AA1235p9",<br>"senFW": "1.23.AABBCC-1",<br>"tstamp": "20190722175834700",<br>"nObj": "2",<br>"exceptFlags": "0",<br>"id": "1",<br>"objType": "Human",<br>"zoneStat": ["Z2"],<br>"edgeEvent": "Enter 2 at Top",<br>"vel": ["0.500", "−1.000"],<br>"pos": ["1.754", "4.221", "5.001"],<br>"size": ["0.234", "0.05", "0.200"],<br>"id": "2",<br>"objType": "Human",<br>"zoneStat": ["Z1"],<br>"edgeEvent": "Enter 1 Right",<br>"vel": ["−1.050", "−0.250"],<br>"pos": ["4.234", "3.000", "5.001"],<br>"size": ["0.234", "0.05", "0.200"] |

Figure 4I:
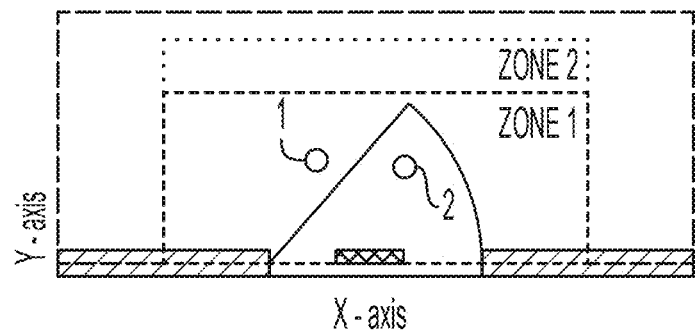

In FIG. 4I, the time is T+800 ms. An edge event indicates that object "1" entered Zone 1 at the "top." While not shown in this example, another edge event may also be included to indicate that object "1" exited Zone 2 at the "bottom."

| Full Message | Simple Message (no spaces, <CR>, <LF> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175834800",<br>    "nObj": "2"<br>  },<br>  "exceptions": {<br>    "exceptFlags": "0"<br>  },<br>  "objects": [<br>    {<br>      "id": "1",<br>      "objType": "Human",<br>      "zoneStat": ["Z1"],<br>      "edgeEvent": "Enter 1 at Top",<br>      "vel": ["0.500", "−1.000"],<br>      "pos": ["2.000", "3.221", "5.001"],<br>      "size": ["0.234", "0.05", "0.200"]<br>    },<br>    {<br>      "id": "2",<br>      "objType": "Human",<br>      "zoneStat": ["Z1"],<br>      "edgeEvent": "n/a", | "senName": "TOF-777-A",<br>"senHW": "2.30.AA1235p9",<br>"senFW": "1.23.AABBCC-1",<br>"tstamp": "20190722175834800",<br>"nObj": "2",<br>"exceptFlags": "0",<br>"id": "1",<br>"objType": "Human",<br>"zoneStat": ["Z1"],<br>"edgeEvent": "Enter 1 at Top",<br>"vel": ["0.500", "−1.000"],<br>"pos": ["2.000", "3.221", "5.001"],<br>"size": ["0.234", "0.05", "0.200"],<br>"id": "2",<br>"objType": "Human",<br>"zoneStat": ["Z1"],<br>"edgeEvent": "n/a",<br>"vel": ["−1.050", "−0.250"],<br>"pos": ["3.234", "2.750", "5.001"],<br>"size": ["0.234", "0.05", "0.200"] |

| Full Message | Simple Message (no spaces, \<CR\>, \<LF\> needed) |
|---|---|
|         "vel": ["−1.050", "−0.250"],<br>        "pos": ["3.234", "2.750",<br>"5.001"],<br>        "size": ["0.234", "0.05", "0.200"]<br>      }<br>  ]<br>} | |

Figure 4J:
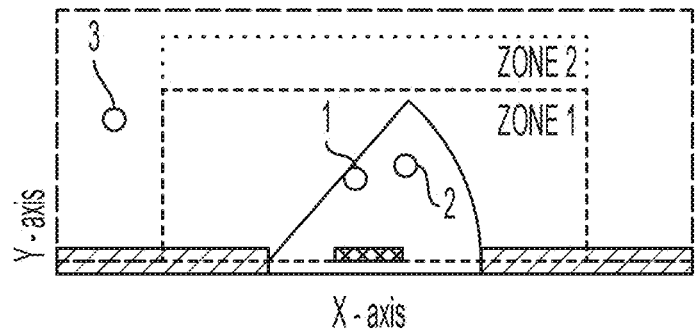

In FIG. 4J, the time is T+900 mS. Objects "1" and "2" are still in Zone 1 (no edge events), but there are now three objects; object "3" of type "Human" has entered the field of view.

| Full Message | Simple Message (no spaces, \<CR\>, \<LF\> needed) |
|---|---|
| {<br>    "header": {<br>        "senName": "TOF-777-A",<br>        "senHW": "2.30.AA1235p9",<br>        "senFW": "1.23.AABBCC-1",<br>        "tStamp": "20190722175834900",<br>        "nObj": "3"<br>    },<br>    "exceptions": {<br>        "exceptFlags": "0"<br>    },<br>    "objects": [<br>      {<br>        "id": "1",<br>        "objType": "Human",<br>        "zoneStat": ["Z1"],<br>        "edgeEvent": "n/a",<br>        "vel": ["0.500", "−1.000"],<br>        "pos": ["2.500", "2.221",<br>"5.001"],<br>        "size": ["0.234", "0.05", "0.200"]<br>      },<br>      {<br>        "id": "2",<br>        "objType": "Human",<br>        "zoneStat": ["Z1"],<br>        "edgeEvent": "n/a",<br>        "vel": ["0", "0"],<br>        "pos": ["3.234", "2.750",<br>"5.001"],<br>        "size": ["0.234", "0.05", "0.200"]<br>      },<br>      {<br>        "id": "3",<br>        "objType": "Human",<br>        "zoneStat": ["None"],<br>        "edgeEvent": "n/a",<br>        "vel": ["−.250", "1.000"],<br>        "pos": ["1.000", "4.000",<br>"5.001"],<br>        "size": ["0.234", "0.05", "0.200"]<br>      }<br>    ]<br>} | "senName": "TOF-777-A",<br>"senHW": "2.30.AA1235p9",<br>"senFW": "1.23.AABBCC-1",<br>"tStamp": "20190722175834900",<br>"nObj": "3",<br>"exceptFlags": "0"<br>"id": "1",<br>"objType": "Human",<br>"zoneStat": ["Z1"],<br>"edgeEvent": "n/a",<br>"vel": ["0.500", "−1.000"],<br>"pos": ["2.500", "2.221", "5.001"],<br>"size": ["0.234", "0.05", "0.200"]<br>"id": "2",<br>"objType": "Human",<br>"zoneStat": ["Z1"],<br>"edgeEvent": "n/a",<br>"vel": ["0", "0"],<br>"pos": ["3.234", "2.750", "5.001"],<br>"size": ["0.234", "0.05", "0.200"]<br>"id": "3",<br>"objType": "Human",<br>"zoneStat": ["None"],<br>"edgeEvent": "n/a",<br>"vel": ["−.250", "1.000"],<br>"pos": ["1.000", "4.000", "5.001"],<br>"size": ["0.234", "0.05", "0.200"] |

Figure 4K:
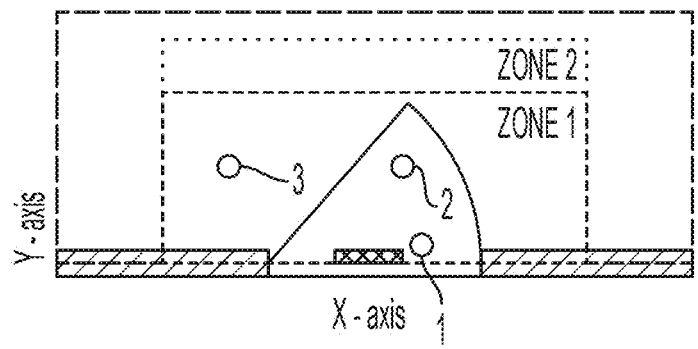

In FIG. 4K, the time is T+1000 mS. An edge event indicates that object "3" entered Zone 1 at the "left."

| Full Message | Simple Message (no spaces, \<CR\>, \<LF\> needed) |
|---|---|
| {<br>    "header": {<br>        "senName": "TOF-777-A",<br>        "senHW": "2.30.AA1235p9", | "senName": "TOF-777-A",<br>"senHW": "2.30.AA1235p9",<br>"senFW": "1.23.AABBCC-1",<br>"tstamp": "20190722175835000", |

| Full Message | Simple Message (no spaces, <CR>, <LF> needed) |
|---|---|
| ``` ``` | ``` ``` |
|         "senFW": "1.23.AABBCC-1", | "nObj": "3" |
|         "tstamp": "20190722175835000", | "exceptFlags": "0" |
|         "nObj": "3" | "id": "1", |
|     }, | "objType": "Human", |
|     "exceptions": { | "zoneStat": ["Z1"], |
|         "exceptFlags": "0" | "edgeEvent": "n/a", |
|     }, | "vel": ["0.500", "−1.000"], |
|     "objects": [ | "pos": ["1.000", "3.221", "5.001"], |
|         { | "size": ["0.234", "0.05", "0.200"] |
|             "id": "1", | "id": "2", |
|             "objType": "Human", | "objType": "Human", |
|             "zoneStat": ["Z1"], | "zoneStat": ["Z1"], |
|             "edgeEvent": "n/a", | "edgeEvent": "n/a", |
|             "vel": ["0.500", "−1.000"], | "vel": ["0", "0"], |
|             "pos": ["1.000", "3.221", "5.001"], | "pos": ["3.234", "2.750", "5.001"], |
|             "size": ["0.234", "0.05", "0.200"] | "size": ["0.234", "0.05", "0.200"] |
|         }, | "id": "3", |
|         { | "objType": "Human", |
|             "id": "2", | "zoneStat": ["Z1"], |
|             "objType": "Human", | "edgeEvent": "Entered at Left", |
|             "zoneStat": ["Z1"], | "vel": ["1.250", "−.500"], |
|             "edgeEvent": "n/a", | "pos": ["2.250", "3.500", "5.001"], |
|             "vel": ["0", "0"], | "size": ["0.234", "0.05", "0.200"] |
|             "pos": ["3.234", "2.750", "5.001"], | |
|             "size": ["0.234", "0.05", "0.200"] | |
|         }, | |
|         { | |
|             "id": "3", | |
|             "objType": "Human", | |
|             "zoneStat": ["Z1"], | |
|             "edgeEvent": "Entered at Left", | |
|             "vel": ["1.250", "−.500"], | |
|             "pos": ["2.250", "3.500", "5.001"], | |
|             "size": ["0.234", "0.05", "0.200"] | |
|         } | |
|     ] | |
| } | |

Figure 4L:
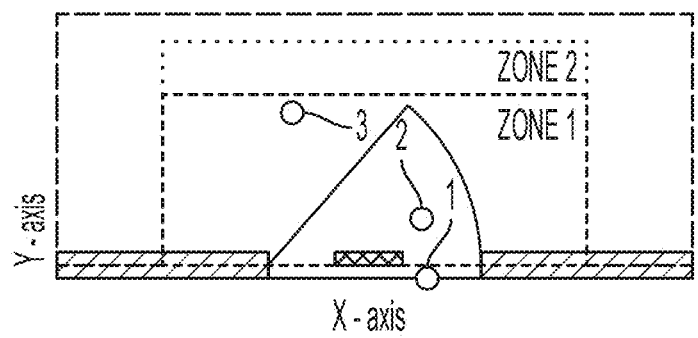

In FIG. 4L, the time is T+1100 mS. An edge event indicates that object "1" exited Zone 1 at the "bottom."

| Full Message | Simple Message (no spaces, <CR>, <LF> needed) |
|---|---|
| { | "senName": "TOF-777-A", |
|     "header": { | "senHW": "2.30.AA1235p9", |
|         "senName": "TOF-777-A", | "senFW": "1.23.AABBCC-1", |
|         "senHW": "2.30.AA1235p9", | "tstamp": "20190722175835100", |
|         "senFW": "1.23.AABBCC-1", | "nObj": "3" |
|         "tstamp": "20190722175835100", | "exceptFlags": "0" |
|         "nObj": "3" | "id": "1", |
|     }, | "objType": "Human", |
|     "exceptions": { | "zoneStat": ["None"], |
|         "exceptFlags": "0" | "edgeEvent": "Exit 1 Bottom", |
|     }, | "vel": [".256", "−.500"], |
|     "objects": [ | "pos": ["0", "0", "0"], |
|         { | "size": ["0", "0", "0"] |
|             "id": "1", | "id": "2", |
|             "objType": "Human", | "objType": "Human", |
|             "zoneStat": ["None"], | "zoneStat": ["Z1"], |
|             "edgeEvent": "Exit 1 Bottom", | "edgeEvent": "n/a", |
|             "vel": [".256", "−.500"], | "vel": ["0", "−.500"], |
|             "pos": ["0", "0", "0"], | "pos": ["3.234", "2.250", "5.001"], |
|             "size": ["0", "0", "0"] | "size": ["0.234", "0.05", "0.200"] |
|         }, | "id": "3", |
|         { | "objType": "Human", |
|             "id": "2", | "zoneStat": ["Z1"], |
|             "objType": "Human", | "edgeEvent": "n/a", |
|             "zoneStat": ["Z1"], | "vel": ["1.250", "0.500"], |
|             "edgeEvent": "n/a", | "pos": ["3.550", "4.000", "5.001"], |

| Full Message | Simple Message (no spaces, <CR>, <LF> needed) |
|---|---|
|         "vel": ["0", "−.500"],<br>        "pos": ["3.234", "2.250", "5.001"],<br>        "size": ["0.234", "0.05", "0.200"]<br>    },<br>    {<br>        "id": "3",<br>        "objType": "Human",<br>        "zoneStat": ["Z1"],<br>        "edgeEvent": "n/a",<br>        "vel": ["1.250", "0.500"],<br>        "pos": ["3.550", "4.000", "5.001"],<br>        "size": ["0.234", "0.05", "0.200"]<br>    }<br>    ]<br>} | "size": ["0.234", "0.05", "0.200"] |

Figure 4M:
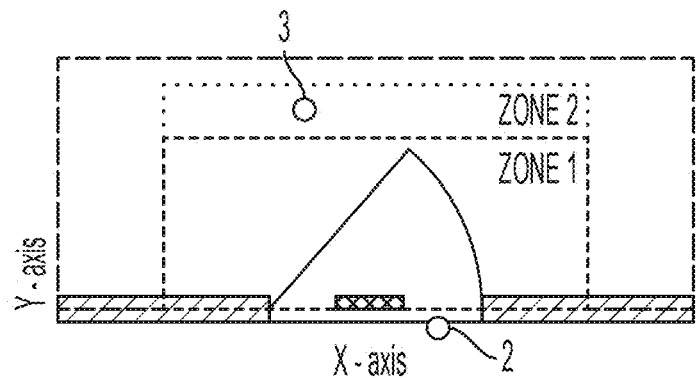

In FIG. 4M, the time is T+1200 mS. Edge events indicates that object "2" exited Zone 1 at the "bottom" and object "3" entered Zone 2 at the "bottom." While not shown in this example, another edge event may also be included to indicate that object "3" exited Zone 1 at the "top."

| Full Message | Simple Message (no spaces, <CR>, <LF> needed) |
|---|---|
| {<br>    "header": {<br>        "senName": "TOF-777-A",<br>        "senHW": "2.30.AA1235p9",<br>        "senFW": "1.23.AABBCC-1",<br>        "tstamp": "20190722175835200",<br>        "nObj": "2"<br>    },<br>    "exceptions": {<br>        "exceptFlags": "0"<br>    },<br>    "objects": [<br>        {<br>            "id": "2",<br>            "objType": "Human",<br>            "zoneStat": ["None"],<br>            "edgeEvent": "Exit 1 Bottom",<br>            "vel": ["0", "−.500"],<br>            "pos": ["0", "0", "0"],<br>            "size": ["0", "0", "0"]<br>        },<br>        {<br>            "id": "3",<br>            "objType": "Human",<br>            "zoneStat": ["Z2"],<br>            "edgeEvent": "Entered at Bottom",<br>            "vel": ["1.250", "0.500"],<br>            "pos": ["3.550", "4.500", "5.001"],<br>            "size": ["0.234", "0.05", "0.200"]<br>        }<br>    ]<br>} | "senName": "TOF-777-A",<br>"senHW": "2.30.AA1235p9",<br>"senFW": "1.23.AABBCC-1",<br>"tstamp": "20190722175835200",<br>"nObj": "2"<br>"exceptFlags": "0"<br>"id": "2",<br>"objType": "Human",<br>"zoneStat": ["None"],<br>"edgeEvent": "Exit 1 Bottom",<br>"vel": ["0", "−.500"],<br>"pos": ["0", "0","0"],<br>"size": ["0", "0","0"]<br>"id": "3",<br>"objType": "Human",<br>"zoneStat": ["Z2"],<br>"edgeEvent": "Entered at Bottom",<br>"vel": ["1.250", "0.500"],<br>"pos": ["3.550", "4.500","5.001"],<br>"size": ["0.234", "0.05","0.200"] |

Figure 4N:
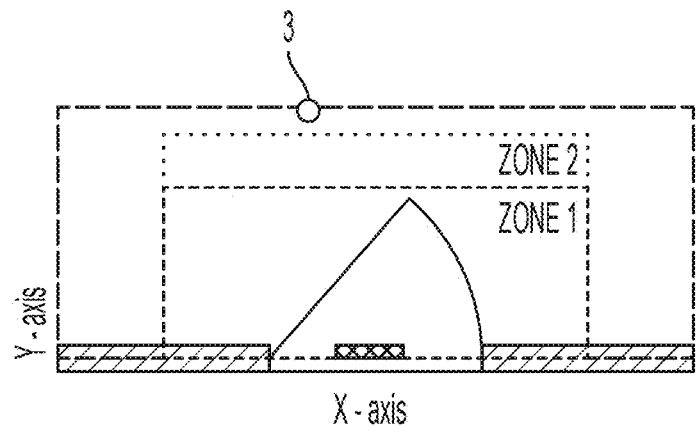

In FIG. 4N, the time is T+1300 mS. An edge event indicates that object "3" exited Zone 2 at the "top."

| Full Message | Simple Message (no spaces, <CR>, <LF> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175835300",<br>    "nObj": "1"<br>  },<br>  "exceptions": {<br>    "exceptFlags": "0"<br>  },<br>  "objects": [<br>    {<br>      "id": "3",<br>      "objType": "Human",<br>      "zoneStat": ["None"],<br>      "edgeEvent": "Exit 2 Top",<br>      "vel": ["−0.250", "0.500"],<br>      "pos": ["3.250", "5.500", "5.001"],<br>      "size": ["0.234", "0.05", "0.200"]<br>    }<br>  ]<br>} | "senName": "TOF-777-A",<br>"senHW": "2.30.AA1235p9",<br>"senFW": "1.23.AABBCC-1",<br>"tstamp": "20190722175835300",<br>"nObj": "1"<br>"exceptFlags": "0"<br>"id": "3",<br>"objType": "Human",<br>"zoneStat": ["None"],<br>"edgeEvent": "Exit 2 Top",<br>"vel": ["−0.250", "0.500"],<br>"pos": ["3.250", "5.500","5.001"],<br>"size": ["0.234", "0.05","0.200"] |

Figure 4O:
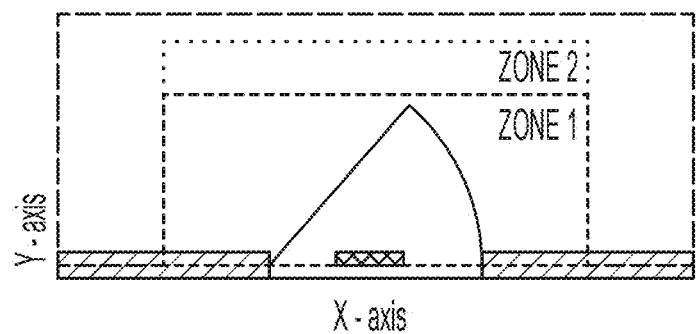

In FIG. 4O, the time is T+1400 mS. Once again, there are no objects detected in the field of view ("nObj": "0").

| Full Message | Simple Message (no spaces, <CR>, <LF> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175835400",<br>    "nObj": "0"<br>  },<br>  "exceptions": {<br>    "exceptFlags": "0"<br>  },<br>  "objects": [<br>  ]<br>} | "senName": "TOF-777-A",<br>"senHW": "2.30.AA1235p9",<br>"senFW": "1.23.AABBCC-1",<br>"tstamp": "20190722175835400",<br>"nObj": "0"<br>"exceptFlags": "0" |

Figure 4P:
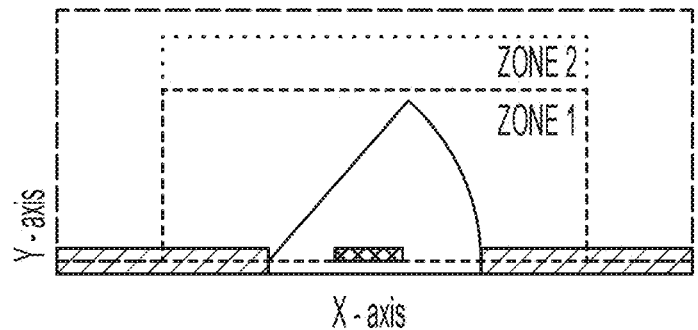

In FIG. 4P, the time is T+2000 mS. The message indicates that a hardware fault has occurred ("exceptFlags": "2").

| Full Message | Simple Message (no spaces, <CR>, <LF> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175836000",<br>    "nObj": "0"<br>  },<br>  "exceptions": {<br>    "exceptFlags": "2"<br>  },<br>  "objects": [<br>  ]<br>} | "senName": "TOF-777-A",<br>"senHW": "2.30.AA1235p9",<br>"senFW": "1.23.AABBCC-1",<br>"tstamp": "20190722175836000",<br>"nObj": "0"<br>"exceptFlags": "2" |

Figure 4Q:
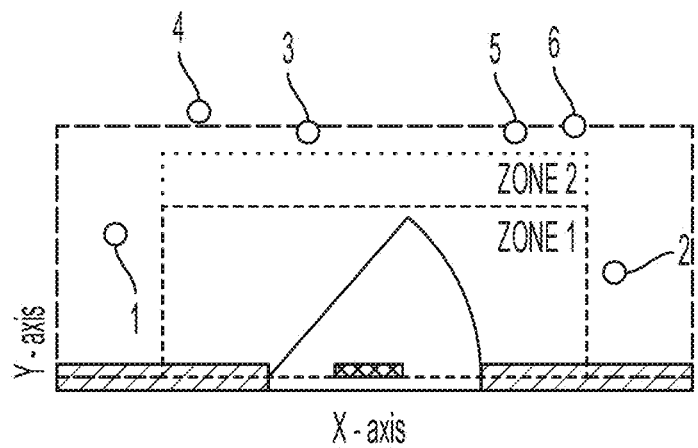

In FIG. 4Q, six objects of type "Human" have entered the field of view. In this example, two packets capture information about the six objects. For example, two packets may be required due to packet size restrictions. The first message packet (at time T+6000 mS) includes information about objects "1," "2," and "3." The second message packet (at time T+6010 mS) includes information about objects "4," "5," and "6."

| Full Message | Simple Message (no spaces, \<CR\>, \<LF\> needed) |
|---|---|
| {<br>  "header": {<br>    "senName": "TOF-777-A",<br>    "senHW": "2.30.AA1235p9",<br>    "senFW": "1.23.AABBCC-1",<br>    "tstamp": "20190722175840000",<br>    "nObj": "3"<br>  },<br>  "exceptions": {<br>    "exceptFlags": "0"<br>  },<br>  "objects": [<br>    {<br>      "id": "1",<br>      "objType": "Human",<br>      "zoneStat": ["None"],<br>      "edgeEvent": "n/a",<br>      "vel": [".256", "-.500"],<br>      "pos": ["0", "0", "0"],<br>      "size": ["0", "0", "0"]<br>    },<br>    {<br>      "id": "2",<br>      "objType": "Human",<br>      "zoneStat": ["None"],<br>      "edgeEvent": "n/a",<br>      "vel": ["0", "-.500"],<br>      "pos": ["3.234", "2.250", "5.001"],<br>      "size": ["0.234", "0.05", "0.200"]<br>    },<br>    {<br>      "id": "3",<br>      "objType": "Human",<br>      "zoneStat": ["None"],<br>      "edgeEvent": "n/a",<br>      "vel": ["1.250", "0.500"],<br>      "pos": ["3.550", "4.000", "5.001"],<br>      "size": ["0.234", "0.05", "0.200"]<br>    }<br>  ]<br>} | "senName": "TOF-777-A",<br>"senHW": "2.30.AA1235p9",<br>"senFW": "1.23.AABBCC-1",<br>"tstamp": "20190722175840000",<br>"nObj": "4"<br>"exceptFlags": "0"<br>"id": "1",<br>"objType": "Human",<br>"zoneStat": ["None"],<br>"edgeEvent": "n/a",<br>"vel": [".256", "-.500"],<br>"pos": ["0", "0", "0"],<br>"size": ["0", "0", "0"]<br>"id": "2",<br>"objType": "Human",<br>"zoneStat": ["None"],<br>"edgeEvent": "n/a",<br>"vel": ["0", "-.500"],<br>"pos": ["3.234", "2.250", "5.001"],<br>"size": ["0.234", "0.05", "0.200"]<br>"id": "3",<br>"objType": "Human",<br>"zoneStat": ["None"],<br>"edgeEvent": "n/a",<br>"vel": ["1.250", "0.500"],<br>"pos": ["3.550", "4.000", "5.001"],<br>"size": ["0.234", "0.05", "0.200"]<br>"id": "4",<br>"objType": "Human",<br>"zoneStat": ["None"],<br>"edgeEvent": "n/a",<br>"vel": ["1.250", "0.500"],<br>"pos": ["3.550", "4.000", "5.001"],<br>"size": ["0.234", "0.05", "0.200"] |
| {<br>  "header": {<br>    "senName": "TOF-777-A",<br>    "senHW": "2.30.AA1235p9",<br>    "senFW": "1.23.AABBCC-1",<br>    "tstamp": "20190722175840010",<br>    "nObj": "3"<br>  },<br>  "exceptions": {<br>    "exceptFlags": "0"<br>  },<br>  "objects": [<br>    {<br>      "id": "4",<br>      "objType": "Human",<br>      "zoneStat": ["None"],<br>      "edgeEvent": "n/a",<br>      "vel": [".256", "-.500"],<br>      "pos": ["0", "0", "0"],<br>      "size": ["0", "0", "0"]<br>    },<br>    {<br>      "id": "5",<br>      "objType": "Human",<br>      "zoneStat": ["None"],<br>      "edgeEvent": "n/a", | "senName": "TOF-777-A",<br>"senHW": "2.30.AA1235p9",<br>"senFW": "1.23.AABBCC-1",<br>"tstamp": "20190722175840010",<br>"nObj": "2"<br>"exceptFlags": "0"<br>"id": "5",<br>"objType": "Human",<br>"zoneStat": ["None"],<br>"edgeEvent": "n/a",<br>"vel": [".256", "-.500"],<br>"pos": ["0", "0", "0"],<br>"size": ["0", "0", "0"]<br>"id": "6",<br>"objType": "Human",<br>"zoneStat": ["None"],<br>"edgeEvent": "n/a",<br>"vel": ["0", "-.500"],<br>"pos": ["3.234", "2.250", "5.001"],<br>"size": ["0.234", "0.05", "0.200"] |

| Full Message | Simple Message (no spaces, <CR>, <LF> needed) |
|---|---|
|            "vel": ["0", "−.500"],<br>           "pos": ["3.234", "2.250", "5.001"],<br>           "size": ["0.234", "0.05", "0.200"]<br>        },<br>        {<br>           "id": "6",<br>           "objType": "Human",<br>           "zoneStat": ["None"],<br>           "edgeEvent": "n/a",<br>           "vel": ["1.250", "0.500"],<br>           "pos": ["3.550", "4.000", "5.001"],<br>           "size": ["0.234", "0.05", "0.200"]<br>        }<br>    ]<br>} | |

Figure 4R:
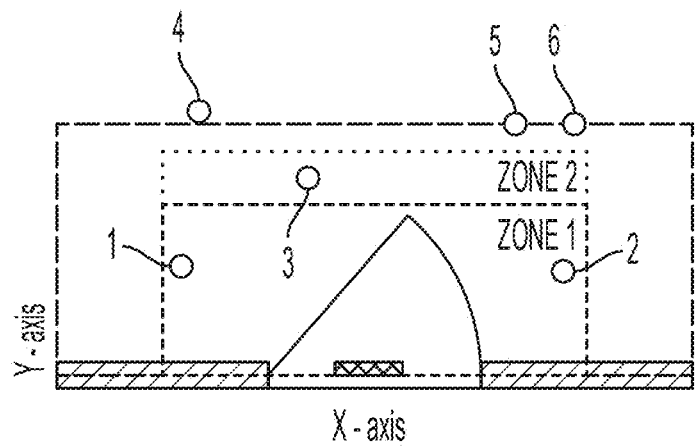

In FIG. 4R, the six objects have moved in the field of view. Edge events indicate that object "1" entered Zone 1 at the "left," object "2" entered Zone 1 at the "right," and object "3" entered Zone 2 at the "top." Again, two message packets are provided. The first message packet (at time T+6100 mS) includes information about objects "1," "2," and "3." The second message packet (at time T+6110 mS) includes information about objects "4," "5," and "6."

| Full Message | Simple Message (no spaces, <CR>, <LF> needed) |
|---|---|
| {<br>    "header": {<br>        "senName": "TOF-777-A",<br>        "senHW": "2.30.AA1235p9",<br>        "senFW": "1.23.AABBCC-1",<br>        "tstamp": "20190722175840100",<br>        "nObj": "3"<br>    },<br>    "exceptions": {<br>        "exceptFlags": "0"<br>    },<br>    "objects": [<br>        {<br>           "id": "1",<br>           "objType": "Human",<br>           "zoneStat": ["Z1"],<br>           "edgeEvent": "Enter 1 Left",<br>           "vel": [".256", "−.500"],<br>           "pos": ["0", "0", "0"],<br>           "size": ["0", "0", "0"]<br>        },<br>        {<br>           "id": "2",<br>           "objType": "Human",<br>           "zoneStat": ["Z1"],<br>           "edgeEvent": "Enter 1 Right",<br>           "vel": ["0", "−.500"],<br>           "pos": ["3.234", "2.250", "5.001"],<br>           "size": ["0.234", "0.05", "0.200"]<br>        },<br>        {<br>           "id": "3",<br>           "objType": "Human",<br>           "zoneStat": ["Z2"],<br>           "edgeEvent": "Enter 2 Top",<br>           "vel": ["1.250", "0.500"],<br>           "pos": ["3.550", "4.000", "5.001"],<br>           "size": ["0.234", "0.05", "0.200"]<br>        }<br>    ]<br>}<br>{<br>    "header": {<br>        "senName": "TOF-777-A",<br>        "senHW": "2.30.AA1235p9", | "senName": "TOF-777-A",<br>"senHW": "2.30.AA1235p9",<br>"senFW": "1.23.AABBCC-1",<br>"tstamp": "20190722175840100",<br>"nObj": "4"<br>"exceptFlags": "0"<br>"id": "1",<br>"objType": "Human",<br>"zoneStat": ["Z1"],<br>"edgeEvent": "Enter 1 Left",<br>  "vel": [".256", "−.500"],<br>"pos": ["0", "0", "0"],<br>"size": ["0", "0", "0"]<br>"id": "2",<br>"objType": "Human",<br>"zoneStat": ["Z1"],<br>"edgeEvent": "Enter 1 Right",<br>  "vel": ["0", "−.500"],<br>"pos": ["3.234", "2.250", "5.001"],<br>"size": ["0.234", "0.05", "0.200"]<br>"id": "3",<br>"objType": "Human",<br>"zoneStat": ["Z2"],<br>"edgeEvent": "Enter 2 Top",<br>  "vel": ["1.250", "0.500"],<br>"pos": ["3.550", "4.000", "5.001"],<br>"size": ["0.234", "0.05", "0.200"]<br>"id": "4",<br>"objType": "Human",<br>"zoneStat": "None",<br>"edgeEvent": "n/a",<br>  "vel": ["1.250", "0.500"],<br>"pos": ["3.550", "4.000", "5.001"],<br>"size": ["0.234", "0.05", "0.200"]<br><br><br>"senName": "TOF-777-A",<br>"senHW": "2.30.AA1235p9",<br>"senFW": "1.23.AABBCC-1",<br>"tstamp": "20190722175840110", |

| Full Message | Simple Message (no spaces, <CR>, <LF> needed) |
|---|---|
| "senFW": "1.23.AABBCC-1",<br>"tstamp": "20190722175840110",<br>"nObj": "3"<br>},<br>"exceptions": {<br>"exceptFlags": "0"<br>},<br>"objects": [<br>{<br>"id": "4",<br>"objType": "Human",<br>"zoneStat": ["None"],<br>"edgeEvent": "n/a",<br>"vel": [".256", "-.500"],<br>"pos": ["0", "0", "0"],<br>"size": ["0", "0", "0"]<br>},<br>{<br>"id": "5",<br>"objType": "Human",<br>"zoneStat": ["None"],<br>"edgeEvent": "n/a",<br>"vel": ["0", "-.500"],<br>"pos": ["3.234", "2.250", "5.001"],<br>"size": ["0.234", "0.05", "0.200"]<br>},<br>{<br>"id": "6",<br>"objType": "Human",<br>"zoneStat": ["None"],<br>"edgeEvent": "n/a",<br>"vel": ["1.250", "0.500"],<br>"pos": ["3.550", "4.000", "5.001"],<br>"size": ["0.234", "0.05", "0.200"]<br>}<br>]<br>} | "nObj": "2"<br>"exceptFlags": "0"<br>"id": "5",<br>"objType": "Human",<br>"zoneStat": ["None"],<br>"edgeEvent": "n/a",<br>"vel": [".256", "-.500"],<br>"pos": ["0", "0", "0"],<br>"size": ["0", "0", "0"]<br>"id": "6",<br>"objType": "Human",<br>"zoneStat": ["None"],<br>"edgeEvent": "n/a",<br>"vel": ["0", "-.500"],<br>"pos": ["3.234", "2.250", "5.001"],<br>"size": ["0.234", "0.05", "0.200"] |

Figure 4S:
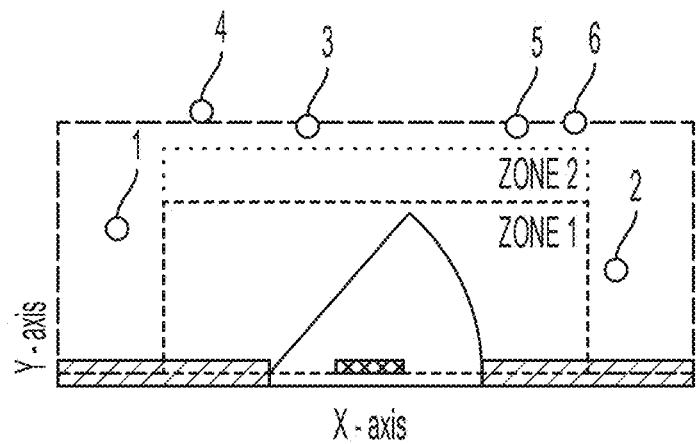

FIG. 4S presents the same scenario as FIG. 4Q. As in FIG. 4Q, six objects of type "Human" have entered the field of view. However, in this example, separate message packets are provided for each object. The message packets are streamed at intervals of 10 mS (i.e., T+6000 mS, T+6010 mS, T+6020 mS, T+6030 mS, T+6040 mS, and T+6050 mS).

| Full Message | Simple Message (no spaces, <CR>, <LF> needed) |
|---|---|
| {<br>"header": {<br>"senName": "TOF-777-A",<br>"senHW": "2.30.AA1235p9",<br>"senFW": "1.23.AABBCC-1",<br>"tstamp": "20190722175840000",<br>"nObj": "1"<br>},<br>"exceptions": {<br>"exceptFlags": "0"<br>},<br>"objects": [<br>{<br>"id": "1",<br>"objType": "Human",<br>"zoneStat": ["None"],<br>"edgeEvent": "n/a",<br>"vel": [".256", "-.500"], | "senName": "TOF-777-A",<br>"senHW": "2.30.AA1235p9",<br>"senFW": "1.23.AABBCC-1",<br>"tstamp": "20190722175840000",<br>"nObj": "1"<br>"exceptFlags": "0"<br>"id": "1",<br>"objType": "Human",<br>"zoneStat": ["None"],<br>"edgeEvent": "n/a",<br>"vel": [".256", "-.500"],<br>"pos": ["0", "0", "0"],<br>"size": ["0", "0", "0"] |

| Full Message | Simple Message (no spaces, \<CR\>, \<LF\> needed) |
|---|---|
| ```
            "pos": ["0", "0", "0"],
            "size": ["0", "0", "0"]
        }
      ]
}
{
    "header": {
        "senName": "TOF-777-A",
        "senHW": "2.30.AA1235p9",
        "senFW": "1.23.AABBCC-1",
        "tstamp": "20190722175840010",
        "nObj": "1"
    },
    "exceptions": {
        "exceptFlags": "0"
    },
    "objects": [
        {
            "id": "2",
            "objType": "Human",
            "zoneStat": ["None"],
            "edgeEvent": "n/a",
            "vel": [".256", "-.500"],
            "pos": ["0", "0", "0"],
            "size": ["0", "0", "0"]
        }
    ]
}
{
    "header": {
        "senName": "TOF-777-A",
        "senHW": "2.30.AA1235p9",
        "senFW": "1.23.AABBCC-1",
        "tstamp": "20190722175840020",
        "nObj": "1"
    },
    "exceptions": {
        "exceptFlags": "0"
    },
    "objects": [
        {
            "id": "3",
            "objType": "Human",
            "zoneStat": ["None"],
            "edgeEvent": "n/a",
            "vel": [".256", "-.500"],
            "pos": ["0", "0", "0"],
            "size": ["0", "0", "0"]
        }
    ]
}
{
    "header": {
        "senName": "TOF-777-A",
        "senHW": "2.30.AA1235p9",
        "senFW": "1.23.AABBCC-1",
        "tstamp": "20190722175840030",
        "nObj": "1"
    },
    "exceptions": {
        "exceptFlags": "0"
    },
    "objects": [
        {
            "id": "4",
            "objType": "Human",
            "zoneStat": ["None"],
            "edgeEvent": "n/a",
            "vel": [".256", "-.500"],
            "pos": ["0", "0", "0"],
            "size": ["0", "0", "0"]
        }
    ]
}
{
    "header": {
``` | ```
"senName": "TOF-777-A",
"senHW": "2.30.AA1235p9",
"senFW": "1.23.AABBCC-1",
"tstamp": "20190722175840010",
"nObj": "1"
"exceptFlags": "0"
"id": "2",
"objType": "Human",
"zoneStat": ["None"],
"edgeEvent": "n/a",
"vel": [".256", "-.500"],
"pos": ["0", "0", "0"],
"size": ["0", "0", "0"]

"senName": "TOF-777-A",
"senHW": "2.30.AA1235p9",
"senFW": "1.23.AABBCC-1",
"tstamp": "20190722175840020",
"nObj": "1"
"exceptFlags": "0"
"id": "3",
"objType": "Human",
"zoneStat": ["None"],
"edgeEvent": "n/a",
"vel": [".256", "-.500"],
"pos": ["0", "0", "0"],
"size": ["0", "0", "0"]

"senName": "TOF-777-A",
"senHW": "2.30.AA1235p9",
"senFW": "1.23.AABBCC-1",
"tstamp": "20190722175840030",
"nObj": "1"
"exceptFlags": "0"
"id": "4",
"objType": "Human",
"zoneStat": ["None"],
"edgeEvent": "n/a",
"vel": [".256", "-.500"],
"pos": ["0", "0", "0"],
"size": ["0", "0", "0"]

"senName": "TOF-777-A",
"senHW": "2.30.AA1235p9",
``` |

-continued

| Full Message | Simple Message (no spaces, <CR>, <LF> needed) |
|---|---|
| ````
        "senName": "TOF-777-A",
        "senHW": "2.30.AA1235p9",
        "senFW": "1.23.AABBCC-1",
        "tstamp": "20190722175840040",
        "nObj": "1"
    },
    "exceptions": {
        "exceptFlags": "0"
    },
    "objects": [
        {
            "id": "5",
            "objType": "Human",
            "zoneStat": ["None"],
            "edgeEvent": "n/a",
            "vel": [".256", "-.500"],
            "pos": ["0", "0", "0"],
            "size": ["0", "0", "0"]
        }
    ]
}
{
    "header": {
        "senName": "TOF-777-A",
        "senHW": "2.30.AA1235p9",
        "senFW": "1.23.AABBCC-1",
        "tstamp": "20190722175840050",
        "nObj": "1"
    },
    "exceptions": {
        "exceptFlags": "0"
    },
    "objects": [
        {
            "id": "6",
            "objType": "Human",
            "zoneStat": ["None"],
            "edgeEvent": "n/a",
            "vel": [".256", "-.500"],
            "pos": ["0", "0", "0"],
            "size": ["0", "0", "0"]
        }
    ]
}
```` | ````
"senFW": "1.23.AABBCC-1",
"tstamp": "20190722175840040",
"nObj": "1"
"exceptFlags": "0"
"id": "5",
"objType": "Human",
"zoneStat": ["None"],
"edgeEvent": "n/a",
"vel": [".256", "-.500"],
"pos": ["0", "0", "0"],
"size": ["0", "0", "0"]

"senName": "TOF-777-A",
"senHW": "2.30.AA1235p9",
"senFW": "1.23.AABBCC-1",
"tstamp": "20190722175840050",
"nObj": "1"
"exceptFlags": "0"
"id": "6",
"objType": "Human",
"zoneStat": ["None"],
"edgeEvent": "n/a",
"vel": [".256", "-.500"],
"pos": ["0", "0", "0"],
"size": ["0", "0", "0"]
```` |

Figure 4T:
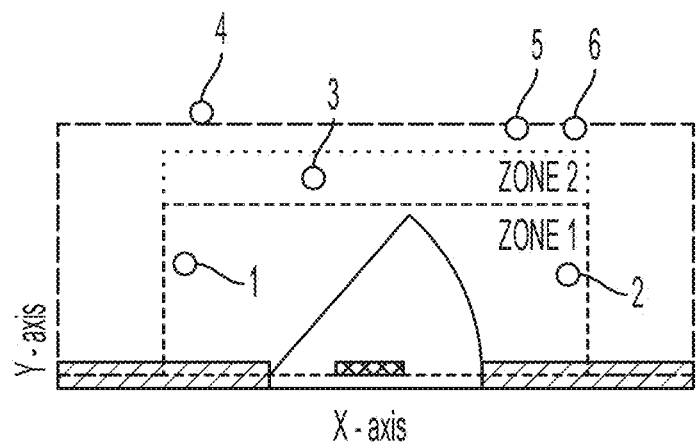

FIG. 4T presents the same scenario as FIG. 4R. Edge events indicate that object "1" entered Zone 1 at the "left," object "2" entered Zone 1 at the "right," and object "3" entered Zone 2 at the "top." However, in the example provided for FIG. 4S, separate message packets are provided for each object. Again, the message packets are streamed at intervals of 10 mS (i.e., T+6100 mS, T+6110 mS, T+6120 mS, T+6130 mS, T+6140 mS, and T+6150 mS).

| Full Message | Simple Message (no spaces, <CR>, <LF> needed) |
|---|---|
| ````
{
    "header": {
        "senName": "TOF-777-A",
        "senHW": "2.30.AA1235p9",
        "senFW": "1.23.AABBCC-1",
        "tstamp": "20190722175840100",
        "nObj": "1"
    },
    "exceptions": {
        "exceptFlags": "0"
    },
    "objects": [
        {
            "id": "1",
            "objType": "Human",
            "zoneStat": "Z1",
            "edgeEvent": "Enter 1 Left",
            "vel": [".256", "-.500"],
            "pos": ["0", "0", "0"],
            "size": ["0", "0", "0"]
```` | ````
"senName": "TOF-777-A",
"senHW": "2.30.AA1235p9",
"senFW": "1.23.AABBCC-1",
"tstamp": "20190722175840100",
"nObj": "1"
"exceptFlags": "0"
"id": "1",
"objType": "Human",
"zoneStat": "Z1",
"edgeEvent": "Enter 1 Left",
"vel": [".256", "-.500"],
"pos": ["0", "0", "0"],
"size": ["0", "0", "0"]
```` |

| Full Message | Simple Message (no spaces, <CR>, <LF> needed) |
|---|---|
| ⋯⋯⋯}<br>⋯⋯]<br>⋯}<br>{<br>⋯⋯"header": {<br>⋯⋯⋯⋯"senName": "TOF-777-A",<br>⋯⋯⋯⋯"senHW": "2.30.AA1235p9",<br>⋯⋯⋯⋯"senFW": "1.23.AABBCC-1",<br>⋯⋯⋯⋯"tstamp": "20190722175840110",<br>⋯⋯⋯⋯"nObj": "1"<br>⋯⋯},<br>⋯⋯"exceptions": {<br>⋯⋯⋯⋯"exceptFlags": "0"<br>⋯⋯},<br>⋯⋯"objects": [<br>⋯⋯⋯⋯{<br>⋯⋯⋯⋯⋯⋯"id": "2",<br>⋯⋯⋯⋯⋯⋯"objType": "Human",<br>⋯⋯⋯⋯⋯⋯"zoneStat": "Z1",<br>⋯⋯⋯⋯⋯⋯"edgeEvent": "Enter 1 Right",<br>⋯⋯⋯⋯⋯⋯"vel": ["0", "−.500"],<br>⋯⋯⋯⋯⋯⋯"pos": ["3.234", "2.250", "5.001"],<br>⋯⋯⋯⋯⋯⋯"size": ["0.234", "0.05", "0.200"]<br>⋯⋯⋯⋯}<br>⋯⋯]<br>} | "senName": "TOF-777-A",<br>"senHW": "2.30.AA1235p9",<br>"senFW": "1.23.AABBCC-1",<br>"tstamp": "20190722175840110",<br>"nObj": "1"<br>"exceptFlags": "0"<br>⋯"id": "2",<br>"objType": "Human",<br>"zoneStat": "Z1",<br>"edgeEvent": "Enter 1 Right",<br>⋯"vel": ["0", "−.500"],<br>"pos": ["3.234", "2.250", "5.001"],<br>"size": ["0.234", "0.05", "0.200"] |
| {<br>⋯⋯"header": {<br>⋯⋯⋯⋯"senName": "TOF-777-A",<br>⋯⋯⋯⋯"senHW": "2.30.AA1235p9",<br>⋯⋯⋯⋯"senFW": "1.23.AABBCC-1",<br>⋯⋯⋯⋯"tstamp": "20190722175840120",<br>⋯⋯⋯⋯"nObj": "1"<br>⋯⋯},<br>⋯⋯"exceptions": {<br>⋯⋯⋯⋯"exceptFlags": "0"<br>⋯⋯},<br>⋯⋯"objects": [<br>⋯⋯⋯⋯{<br>⋯⋯⋯⋯⋯⋯"id": "3",<br>⋯⋯⋯⋯⋯⋯"objType": "Human",<br>⋯⋯⋯⋯⋯⋯"zoneStat": "Z2",<br>⋯⋯⋯⋯⋯⋯"edgeEvent": "Enter 2 Top",<br>⋯⋯⋯⋯⋯⋯"vel": ["1.250", "0.500"],<br>⋯⋯⋯⋯⋯⋯"pos": ["3.550", "4.000", "5.001"],<br>⋯⋯⋯⋯⋯⋯"size": ["0.234", "0.05", "0.200"]<br>⋯⋯⋯⋯}<br>⋯⋯]<br>} | "senName": "TOF-777-A",<br>"senHW": "2.30.AA1235p9",<br>"senFW": "1.23.AABBCC-1",<br>"tstamp": "20190722175840120",<br>"nObj": "1"<br>"exceptFlags": "0"<br>"id": "3",<br>"objType": "Human",<br>"zoneStat": "Z2",<br>"edgeEvent": "Enter 2 Top",<br>⋯"vel": ["1.250", "0.500"],<br>"pos": ["3.550", "4.000", "5.001"],<br>"size": ["0.234", "0.05", "0.200"] |
| {<br>⋯⋯"header": {<br>⋯⋯⋯⋯"senName": "TOF-777-A",<br>⋯⋯⋯⋯"senHW": "2.30.AA1235p9",<br>⋯⋯⋯⋯"senFW": "1.23.AABBCC-1",<br>⋯⋯⋯⋯"tstamp": "20190722175840130",<br>⋯⋯⋯⋯"nObj": "1"<br>⋯⋯},<br>⋯⋯"exceptions": {<br>⋯⋯⋯⋯"exceptFlags": "0"<br>⋯⋯},<br>⋯⋯"objects": [<br>⋯⋯⋯⋯{<br>⋯⋯⋯⋯⋯⋯"id": "4",<br>⋯⋯⋯⋯⋯⋯"objType": "Human",<br>⋯⋯⋯⋯⋯⋯"zoneStat": "None",<br>⋯⋯⋯⋯⋯⋯"edgeEvent": "n/a",<br>⋯⋯⋯⋯⋯⋯"vel": ["1.250", "0.500"],<br>⋯⋯⋯⋯⋯⋯"pos": ["3.550", "4.000", "5.001"],<br>⋯⋯⋯⋯⋯⋯"size": ["0.234", "0.05", "0.200"]<br>⋯⋯⋯⋯}<br>⋯⋯]<br>} | "senName": "TOF-777-A",<br>"senHW": "2.30.AA1235p9",<br>"senFW": "1.23.AABBCC-1",<br>"tstamp": "20190722175840130",<br>"nObj": "1"<br>"exceptFlags": "0"<br>⋯"id": "4",<br>"objType": "Human",<br>"zoneStat": "None",<br>"edgeEvent": "n/a",<br>"vel": ["1.250", "0.500"],<br>"pos": ["3.550", "4.000", "5.001"],<br>"size": ["0.234", "0.05", "0.200"] |
| { | "senName": "TOF-777-A", |

| Full Message | Simple Message (no spaces, <CR>, <LF> needed) |
|---|---|
| "header": {<br>    "senName": "TOF-777-A",<br>    "senHW": "2.30.AA1235p9",<br>    "senFW": "1.23.AABBCC-1",<br>    "tstamp": "20190722175840140",<br>    "nObj": "1"<br>},<br>"exceptions": {<br>    "exceptFlags": "0"<br>},<br>"objects": [<br>    {<br>        "id": "5",<br>        "objType": "Human",<br>        "zoneStat": "None",<br>        "edgeEvent": "n/a",<br>        "vel": ["0", "−.500"],<br>        "pos": ["3.234", "2.250", "5.001"],<br>        "size": ["0.234", "0.05", "0.200"]<br>    }<br>]<br>}<br>{<br>"header": {<br>    "senName": "TOF-777-A",<br>    "senHW": "2.30.AA1235p9",<br>    "senFW": "1.23.AABBCC-1",<br>    "tstamp": "20190722175840150",<br>    "nObj": "1"<br>},<br>"exceptions": {<br>    "exceptFlags": "0"<br>},<br>"objects": [<br>    {<br>        "id": "6",<br>        "objType": "Human",<br>        "zoneStat": "None",<br>        "edgeEvent": "n/a",<br>        "vel": ["1.250", "0.500"],<br>        "pos": ["3.550", "4.000", "5.001"],<br>        "size": ["0.234", "0.05", "0.200"]<br>    }<br>]<br>} | "senHW": "2.30.AA1235p9",<br>"senFW": "1.23.AABBCC-1",<br>"tstamp": "20190722175840140",<br>"nObj": "1"<br>"exceptFlags": "0"<br>"id": "5",<br>"objType": "Human",<br>"zoneStat": "None",<br>"edgeEvent": "n/a",<br>"vel": [".256", "−.500"],<br>"pos": ["3.234", "2.250", "5.001"],<br>"size": ["0.234", "0.05", "0.200"]<br><br>"senName": "TOF-777-A",<br>"senHW": "2.30.AA1235p9",<br>"senFW": "1.23.AABBCC-1",<br>"tstamp": "20190722175840150",<br>"nObj": "1"<br>"exceptFlags": "0"<br>"id": "6",<br>"objType": "Human",<br>"zoneStat": "None",<br>"edgeEvent": "n/a",<br>"vel": ["1.250", "0.500"],<br>"pos": ["3.550", "4.000", "5.001"],<br>"size": ["0.234", "0.05", "0.200"] |

Figure 4U:
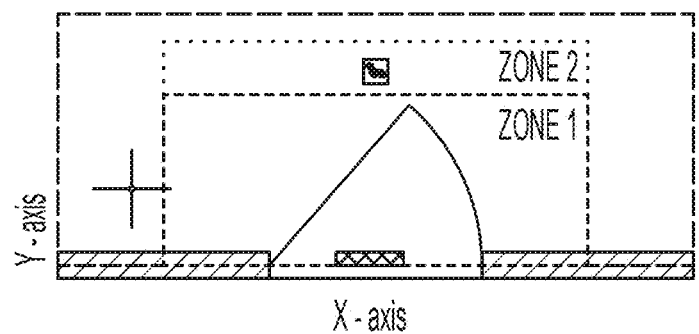

In FIG. 4U, at time T+20000 mS, an edge event indicates that an object of type "Unknown" (in this example, a dog less than 40 pounds) entered Zone 2 at the "top."

| Full Message | Simple Message (no spaces, <CR>, <LF> needed) |
|---|---|
| {<br>    "header": {<br>        "senName": "TOF-777-A",<br>        "senHW": "2.30.AA1235p9",<br>        "senFW": "1.23.AABBCC-1",<br>        "tstamp": "20190722175854000",<br>        "nObj": "1"<br>    },<br>    "exceptions": {<br>        "exceptFlags": "0"<br>    },<br>    "objects": [<br>        {<br>            "id": "1",<br>            "objType": "Unknown",<br>            "zoneStat": ["Z2"],<br>            "edgeEvent": "Enter 2 Top",<br>            "vel": ["1.050", "−1.000"], | "senName": "TOF-777-A",<br>"senHW": "2.30.AA1235p9",<br>"senFW": "1.23.AABBCC-1",<br>"tstamp": "20190722175854000",<br>"nObj": "1",<br>"exceptFlags": "0",<br>"id": "1",<br>"objType": "Unknown",<br>"zoneStat": ["Z2"],<br>"edgeEvent": "Enter 2 Top",<br>"vel": ["1.050", "−1.000"],<br>"pos": ["1.234","3.221","5.001"],<br>"size": ["0.234", "0.05", "0.200"] |

| Full Message | Simple Message (no spaces, \<CR\>, \<LF\> needed) |
|---|---|
| ``` 
        "pos": ["1.234","3.221", "5.001"],
        "size": ["0.234", "0.05", "0.200"]
      }
    ]
}
``` | |

Figure 4V:
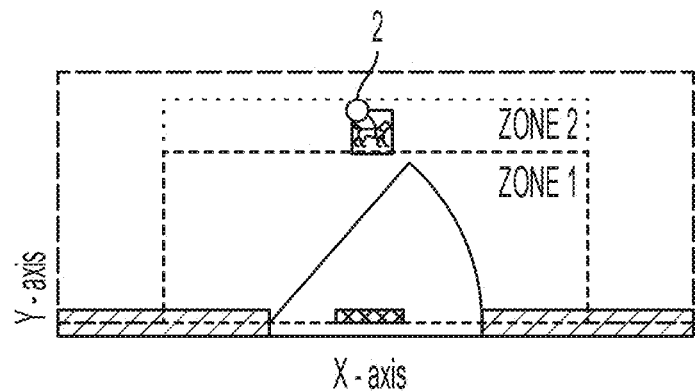
Figure 4W:
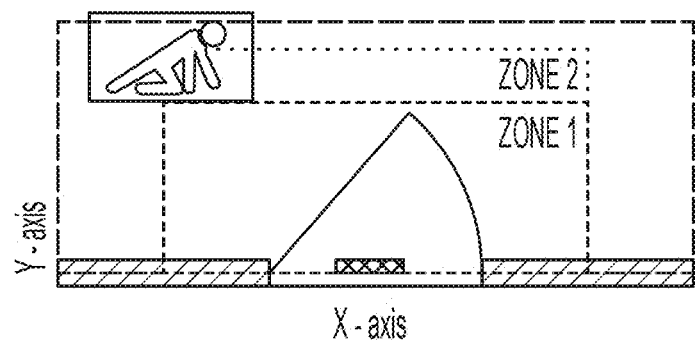

In FIG. 4V, at time T+40000 mS, edge events indicate that an object of type "Human" and an object of type "Other" (in this example, a 50-pound guide dog) entered Zone 2 at the "top."

| Full Message | Simple Message (no spaces, \<CR\>, \<LF\> needed) |
|---|---|
| ``` 
{
    "header": {
        "senName": "TOF-777-A",
        "senHW": "2.30.AA1235p9",
        "senFW": "1.23.AABBCC-1",
        "tstamp": "20190722175856000",
        "nObj": "2"
    },
    "exceptions": {
        "exceptFlags": "0"
    },
    "objects": [
        {
            "id": "2",
            "objType": "Human",
            "zoneStat": ["Z2"],
            "edgeEvent": "Enter 2 Top",
            "vel": ["0", "-.500"],
            "pos": ["0", "0", "0"],
            "size": ["0", "0", "0"]
        },
        {
            "id": "3",
            "objType": "Other",
            "zoneStat": ["Z2"],
            "edgeEvent": "Enter 2 Top",
            "vel": ["1.250", "0.500"],
            "pos": ["3.550", "4.500",
"5.001"],
            "size": ["0.234", "0.05", "0.200"]
        }
    ]
}
``` | ``` 
"senName": "TOF-777-A",
"senHW": "2.30.AA1235p9",
"senFW": "1.23.AABBCC-1",
"tstamp": "20190722175856000",
"nObj": "2"
"exceptFlags": "0"
"id": "2",
"objType": "Human",
"zoneStat": ["Z2"],
"edgeEvent": "Enter 2 Top",
"vel": ["0", "-.500"],
"pos": ["0", "0","0"],
"size": ["0", "0","0"]
"id": "3",
"objType": "Other",
"zoneStat": ["Z2"],
"edgeEvent": "Enter 2 Top",
"vel": ["1.250", "0.500"],
"pos": ["3.550", "4.500","5.001"],
"size": ["0.234", "0.05","0.200"]
``` |

In FIG. 4W, at time T+60000 mS, an edge event indicates that an object of type "Human" crawled into Zone 2 at the "left."

| Full Message | Simple Message (no spaces, \<CR\>, \<LF\> needed) |
|---|---|
| ``` 
{
    "header": {
        "senName": "TOF-777-A",
        "senHW": "2.30.AA1235p9",
        "senFW": "1.23.AABBCC-1",
        "tstamp": "20190722175860000",
        "nObj": "1"
    },
    "exceptions": {
        "exceptFlags": "0"
    },
    "objects": [
        {
``` | ``` 
"senName": "TOF-777-A",
"senHW": "2.30.AA1235p9",
"senFW": "1.23.AABBCC-1",
"tstamp": "20190722175860000",
"nObj": "1",
"exceptFlags": "0",
"id": "1",
"objType": "Human",
"zoneStat": ["Z2"],
"edgeEvent": "Enter 2 Left -Crawl",
"vel": ["1.050", "-1.000"],
"pos": ["1.234","3.221","5.001"],
"size": ["0.234", "0.05", "0.200"]
``` |

-continued

| Full Message | Simple Message (no spaces, <CR>, <LF> needed) |
|---|---|
|     "id": "1",<br>    "objType": "Human",<br>    "zoneStat": ["Z2"],<br>    "edgeEvent": "Enter 2 Left - Crawl",<br>    "vel": ["1.050", "−1.000"],<br>    "pos": ["1.234","3.221", "5.001"],<br>    "size": ["0.234", "0.05", "0.200"]<br>   }<br>  ]<br>} | |

8. Object Detection, Tracking, and Classification

In an embodiment, detecting, tracking, and classifying objects in three-dimensional point clouds is performed, using one or more algorithms described herein, on a dense collection of points in space in front of a 3D sensor. In the examples described herein, it is assumed that the object(s) of interest is/are human. In other examples, the object(s) of interest may be non-human.

Figure 5A:
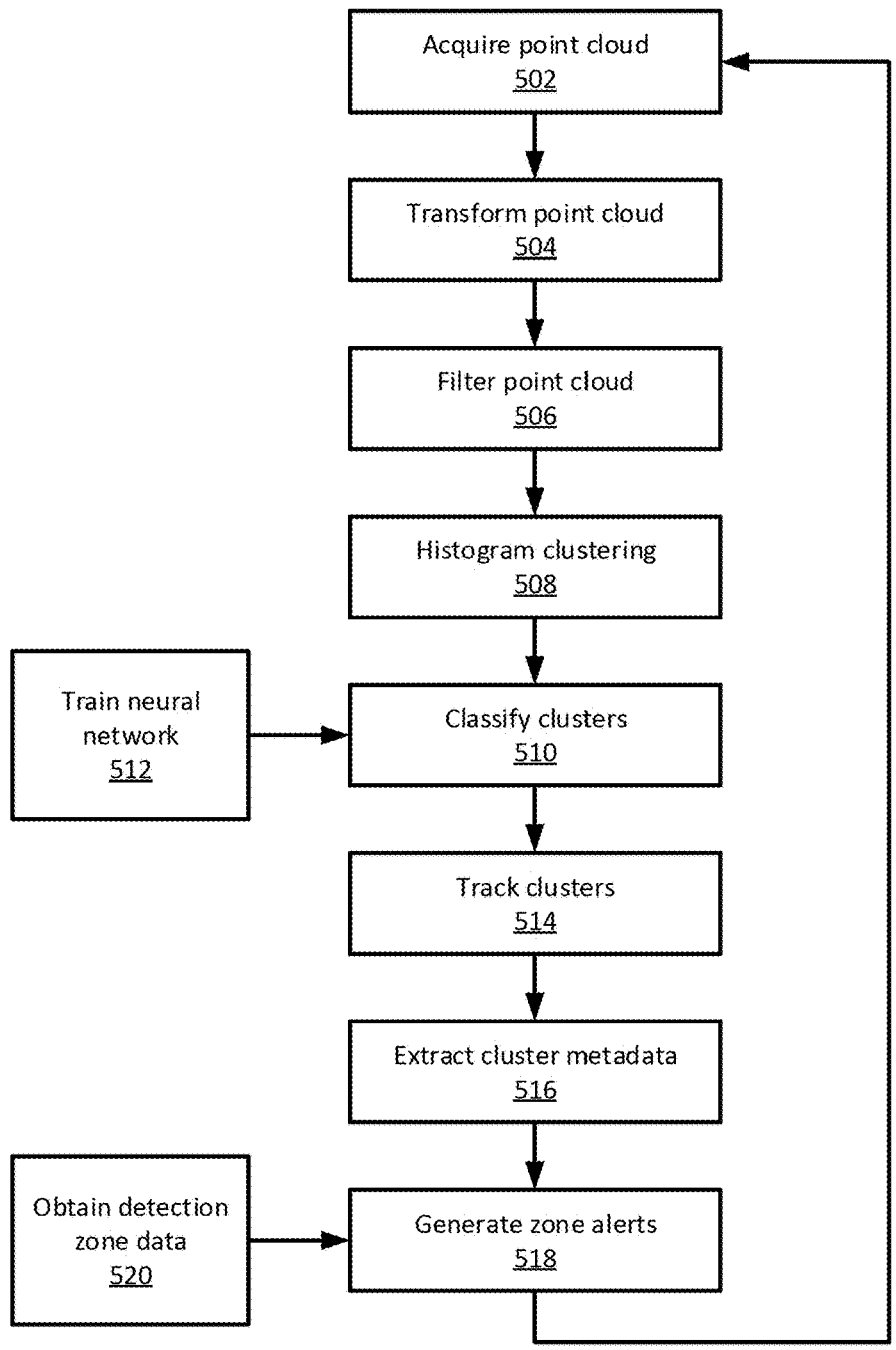
FIG. 5A is a flow diagram of an example of operations for analyzing a point cloud according to an embodiment.

FIG. 5A is a flow diagram of an example of operations for analyzing a point cloud according to an embodiment. One or more operations illustrated in FIG. 5A may be modified, rearranged, or omitted all together. Accordingly, the particular sequence of operations illustrated in FIG. 5A should not be construed as limiting the scope of one or more embodiments.

In an embodiment, a system (e.g., one or more components of the system 100 illustrated in FIG. 1) acquires a point cloud (i.e., a 3D point cloud dataset) from a sensor (Operation 502). The point cloud may be "raw" in the sense that it has not been modified from the form generated by the sensor. Alternatively, the point cloud may have been modified in transit from the sensor. The system may transform the point cloud from a coordinate system used by the sensor to a "world" coordinate system (Operation 504). For example, the system may apply one or more rotations and/or translations to the point cloud, to transform the point cloud to a coordinate system corresponding to the "world" as understood by the component(s) analyzing the point cloud.

After transformation, the system may filter the point cloud to remove noise (Operation 506). For example, filtering may use a K-d tree nearest neighbor search and/or another approach. Alternatively or additionally, the system may crop the point cloud to an operating zone of interest. The system may analyze the point cloud to extract clusters of points that represent objects in the operating zone. The system may perform histogram clustering (Operation 508) using one or more operations described below with respect to FIG. 5B, referred to herein as spatially segmented histogram clustering.

In an embodiment, the system may classifies one or more detected clusters (Operation 510). The system may classify one or more clusters using a neural network and/or another machine learning approach, as described herein. For example, the system may classify a cluster using a neural network based on TensorFlow and/or another machine learning platform. The neural network may use a machine learning model based, e.g., on the Open Neural Network Exchange. The neural network may be trained (Operation 512) using a priori data sets (i.e., training data) that have been labeled/tagged with the appropriate cluster classification(s). These a priori clusters may be projected onto three two-dimensional (2D) image planes, representing the X/Y, X/Z, and Y/Z planes, from which tensor matrices may be calculated. During operation, the projected 2D planes of detected clusters may be evaluated and classified using the neural network and model.

In an embodiment, the system tracks clusters (Operation 514). For example, the system may track classified clusters using a tracking algorithm based on the Joint Probabilistic Data Association Filter (JPDAF). The JPDAF is a statistical method to associate measured detections with tracks. The JPDAF algorithm predicts the future state of a measurement using a Kalman Filter, to associate future detections with past detected locations. This tracking data may be used to associate detected clusters from frame to frame.

After detection, classification, tracking, and identification of clusters, the system may extract cluster metadata (e.g., centroid position, size, velocity, etc.) from the cluster geometry (Operation 516). The system may obtain detection zone data (Operation 520) and evaluate current and previous cluster positions against predefined zones of interest. As clusters enter and exit these zones, the system may generate associated zone alerts (Operation 518).

Figure 5B:
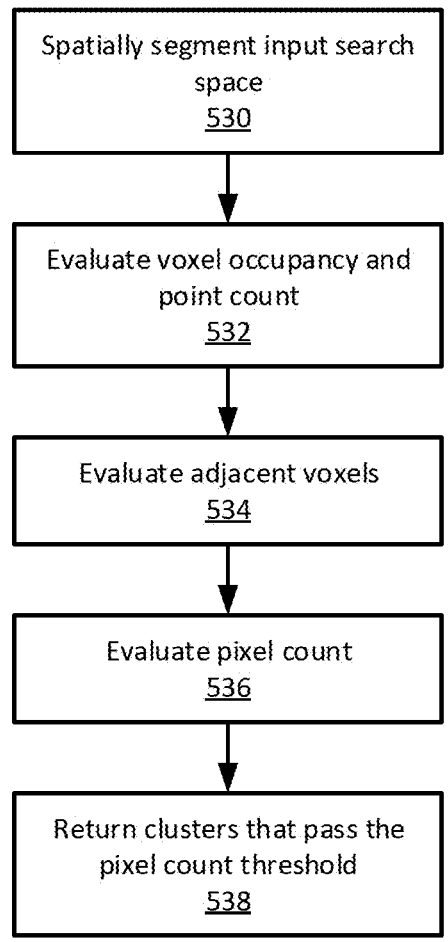
FIG. 5B is a flow diagram of an example of operations for a spatially segmented histogram clustering algorithm according to an embodiment.

FIG. 5B is a flow diagram of an example of operations for a spatially segmented histogram clustering algorithm according to an embodiment. One or more operations illustrated in FIG. 5B may be modified, rearranged, or omitted all together. Accordingly, the particular sequence of operations illustrated in FIG. 5B should not be construed as limiting the scope of one or more embodiments.

In an embodiment, a system (e.g., one or more components of system 100 illustrated in FIG. 1) spatially segments an input search space (Operation 530). The system may segment the input search space into 2D voxels of a given size in the X/Y plane. The system may evaluate these voxels for occupancy and point count (Operation 532). After segmentation, the system may evaluate voxels against each other (Operation 534) for occupied adjacency. The system may collect groups of adjacent voxels into potential clusters. The system may count the number of pixels in each potential cluster and evaluate the count against a pixel count threshold (Operation 536). Clusters that pass the pixel count threshold may then be returned by the algorithm (Operation 538) for further processing.

Figure 5C:
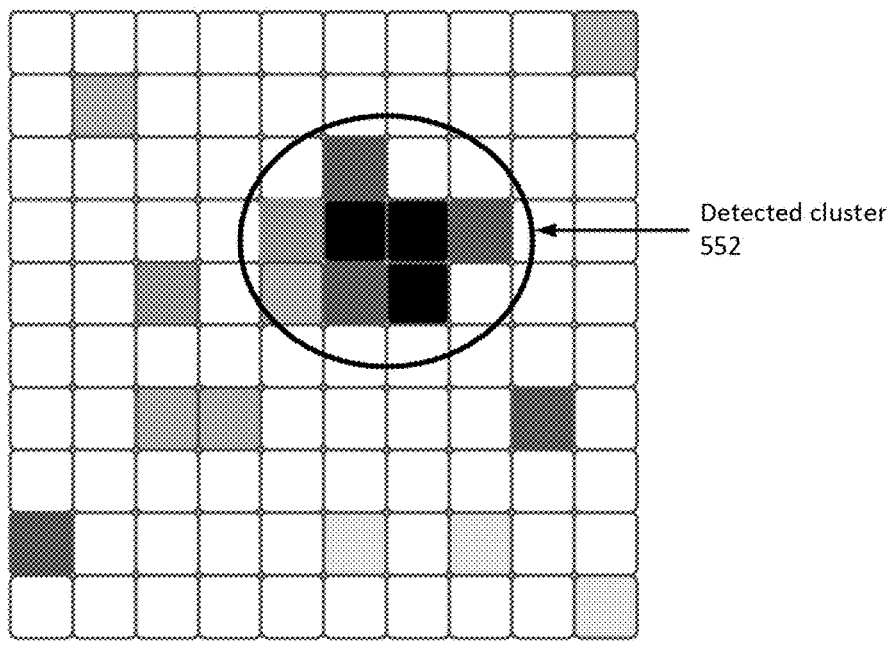
FIG. 5C illustrates an example of cluster detection according to an embodiment.

FIG. 5C illustrates an example of cluster detection according to an embodiment. Specifically, 5C is an example of applying a spatially segmented histogram clustering algorithm as described above. The circled pixels correspond to a detected cluster 552.

9. Machine Learning

As noted above, one or more embodiments use machine learning techniques in one or more operations for providing access control. One or more examples described above use a neural network. In general, in an embodiment, a machine learning engine trains a machine learning model to perform one or more operations, e.g., classifying objects in the field of view and/or differentiating between objects and background. Training a machine learning model uses training data to generate a function that, given one or more inputs to the machine learning model, computes a corresponding output. The output may correspond to a prediction based on prior machine learning. In an embodiment, the output includes a label, classification, and/or categorization assigned to the provided input(s). The machine learning model corresponds to a learned model for performing the desired operation(s) (e.g., labeling, classifying, and/or categorizing inputs). A system may use multiple machine learning engines and/or multiple machine learning models for different purposes.

In an embodiment, the machine learning engine may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. For example, labeled training data may include data representing objects of different kinds that the system is configured to classify and/or backgrounds that the system is configured to ignore. In semi-supervised learning, some inputs are associated with supervisory signals and other inputs are not associated with supervisory signals. In unsupervised learning, the training data does not include supervisory signals. Reinforcement learning uses a feedback system in which the machine learning engine receives positive and/or negative reinforcement in the process of attempting to solve a particular problem (e.g., to optimize performance in a particular scenario, according to one or more predefined performance criteria). In an embodiment, the machine learning engine initially uses supervised learning to train the machine learning model and then uses unsupervised learning to update the machine learning model on an ongoing basis.

In an embodiment, a machine learning engine may use many different techniques to label, classify, and/or categorize inputs. A machine learning engine may transform inputs into feature vectors that describe one or more properties ("features") of the inputs. The machine learning engine may label, classify, and/or categorize the inputs based on the feature vectors. Alternatively or additionally, a machine learning engine may use clustering (also referred to as cluster analysis) to identify commonalities in the inputs. The machine learning engine may group (i.e., cluster) the inputs based on those commonalities. The machine learning engine may use hierarchical clustering, k-means clustering, and/or another clustering method or combination thereof. In an embodiment, a machine learning engine includes an artificial neural network. An artificial neural network includes multiple nodes (also referred to as artificial neurons) and edges between nodes. Edges may be associated with corresponding weights that represent the strengths of connections between nodes, which the machine learning engine adjusts as machine learning proceeds. Alternatively or additionally, a machine learning engine may include a support vector machine. A support vector machine represents inputs as vectors. The machine learning engine may label, classify, and/or categorizes inputs based on the vectors. Alternatively or additionally, the machine learning engine may use a naïve Bayes classifier to label, classify, and/or categorize inputs. Alternatively or additionally, given a particular input, a machine learning model may apply a decision tree to predict an output for the given input. Alternatively or additionally, a machine learning engine may apply fuzzy logic in situations where labeling, classifying, and/or categorizing an input among a fixed set of mutually exclusive options is impossible or impractical. The aforementioned machine learning model and techniques are discussed for exemplary purposes only and should not be construed as limiting one or more embodiments.

10. Miscellanous; Extensions

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

11. Computer Systems and Networks

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 6:
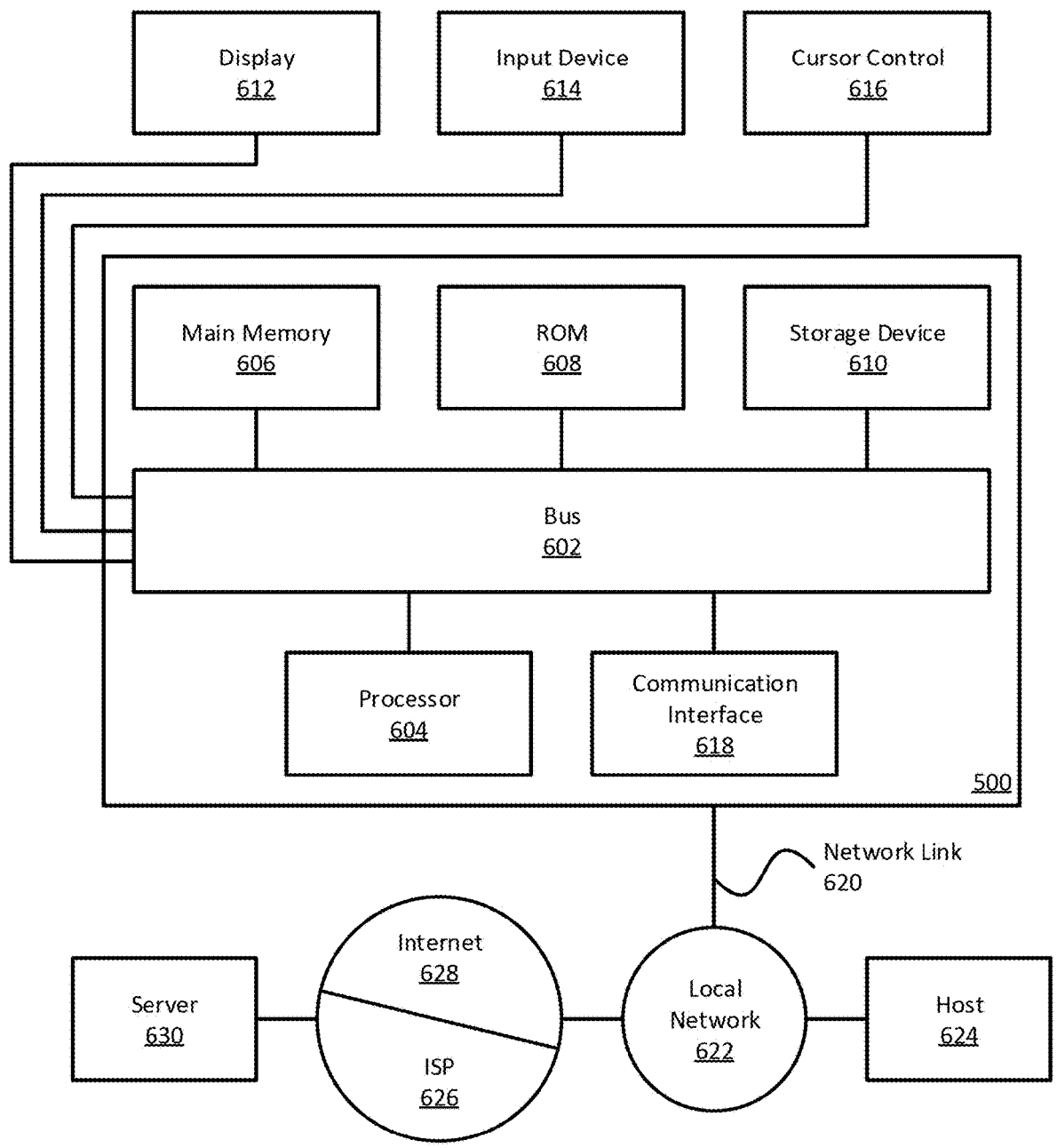
FIG. 6 is a block diagram of an example of a computer system according to an embodiment.

For example, FIG. 6 is a block diagram of an example of a computer system 600 according to an embodiment. Computer system 600 includes a bus 602 or other communication mechanism for communicating information, and a hardware processor 604 coupled with the bus 602 for processing information. Hardware processor 604 may be a general-purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in one or more non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), plasma display, electronic ink display, cathode ray tube (CRT) monitor, or any other kind of device for displaying information to a computer user. An input device 614, including alphanumeric and other keys, may be coupled to bus 602 for communicating information and command selections to processor 604. Alternatively or additionally, computer system 600 may receive user input via a cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Alternatively or additionally, computer system 6 may include a touchscreen. Display 612 may be configured to receive user input via one or more pressure-sensitive sensors, multi-touch sensors, and/or gesture sensors. Alternatively or additionally, computer system 600 may receive user input via a microphone, video camera, and/or some other kind of user input device (not shown).

Computer system 600 may implement the techniques described herein using customized hard-wired logic, one or more ASICs or FPGAs, firmware, and/or program logic which in combination with other components of computer system 600 causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 602. Transmission media may also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 600 may receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622, and communication interface 618.

The received code may be executed by processor 604 as it is received, and/or stored in storage device 610, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory computer-readable media storing instructions that, when executed by one or more processors, cause the one or more processors to execute instructions comprising:
receiving, by an access control system, point cloud data associated with a field of view of a sensor;
based on the point cloud data, determining that an object is entering a physical zone of interest in the field of view, wherein determining that the object is entering the physical zone of interest comprises:
spatially segmenting an input search space into a plurality of voxels in a plane;
determining one or more potential clusters in the plurality of voxels; and
identifying a cluster corresponding to the object in the one or more potential clusters, based at least on a determination that the cluster satisfies a voxel count threshold; and
determining, by the access control system, an access control result indicating that the object is authorized to access the physical zone of interest or is not authorized to access the physical zone of interest.

2. The one or more non-transitory computer-readable media of claim 1, the operations further comprising:
determining, by the access control system, a type of the object entering the physical zone of interest, wherein determining the access control result is based at least on the type of the object.

3. The one or more non-transitory computer-readable media of claim 1, the operations further comprising:
determining, by the access control system, that the object is crawling or is not crawling, wherein determining the access control result is based at least on whether the object is crawling or is not crawling.

4. The one or more non-transitory computer-readable media of claim 1, wherein determining the access control result comprises determining whether the object is piggy-backing or tailgating an authorized object.

5. The one or more non-transitory computer-readable media of claim 1,
wherein the access control result indicates that the object is not authorized to access the physical zone of interest, and
wherein determining the access control result comprises identifying a suspect condition in which the access control system does not detect that the object has been granted access to access the physical zone of interest.

6. The one or more non-transitory computer-readable media of claim 1, wherein the access control system is configured to determine whether the object is one or more of an adult-height person, a child-height person, a person carrying an item, a person wearing a hat, a person pulling or pushing an item, a plurality of people in close proximity, a non-human animal, an occupied wheelchair, an unoccupied wheelchair, an umbrella, a person on another person's back, and/or a person crawling.

7. A system comprising:
at least one device including a hardware processor;
the system being configured to perform operations comprising:
receiving, by an access control system, point cloud data associated with a field of view of a sensor;
based on the point cloud data, determining that an object is entering a physical zone of interest in the field of view, wherein determining that the object is entering the physical zone of interest comprises:
spatially segmenting an input search space into a plurality of voxels in a plane;
determining one or more potential clusters in the plurality of voxels; and
identifying a cluster corresponding to the object in the one or more potential clusters, based at least on a determination that the cluster satisfies a voxel count threshold; and
determining, by the access control system, an access control result indicating that the object is authorized to access the physical zone of interest or is not authorized to access the physical zone of interest.

8. The system of claim 7, the operations further comprising:
determining, by the access control system, a type of the object entering the physical zone of interest, wherein determining the access control result is based at least on the type of the object.

9. The system of claim 7, the operations further comprising:
- determining, by the access control system, that the object is crawling or is not crawling, wherein determining the access control result is based at least on whether the object is crawling or is not crawling.

10. The system of claim 7, wherein determining the access control result comprises determining whether the object is piggybacking or tailgating an authorized object.

11. The system of claim 7,
- wherein the access control result indicates that the object is not authorized to access the physical zone of interest, and
- wherein determining the access control result comprises identifying a suspect condition in which the access control system does not detect that the object has been granted access to access the physical zone of interest.

12. The system of claim 7, wherein the access control system is configured to determine whether the object is one or more of an adult-height person, a child-height person, a person carrying an item, a person wearing a hat, a person pulling or pushing an item, a plurality of people in close proximity, a non-human animal, an occupied wheelchair, an unoccupied wheelchair, an umbrella, a person on another person's back, and/or a person crawling.

13. A method comprising:
- receiving, by an access control system, point cloud data associated with a field of view of a sensor;
- based on the point cloud data, determining that an object is entering a physical zone of interest in the field of view, wherein determining that the object is entering the physical zone of interest comprises:
  - spatially segmenting an input search space into a plurality of voxels in a plane;
  - determining one or more potential clusters in the plurality of voxels; and
  - identifying a cluster corresponding to the object in the one or more potential clusters, based at least on a determination that the cluster satisfies a voxel count threshold; and
- determining, by the access control system, an access control result indicating that the object is authorized to access the physical zone of interest or is not authorized to access the physical zone of interest.

14. The method of claim 13, further comprising:
- determining, by the access control system, a type of the object entering the physical zone of interest, wherein determining the access control result is based at least on the type of the object.

15. The method of claim 13, further comprising:
- determining, by the access control system, that the object is crawling or is not crawling, wherein determining the access control result is based at least on whether the object is crawling or is not crawling.

16. The method of claim 13, wherein determining the access control result comprises determining whether the object is piggybacking or tailgating an authorized object.

17. The method of claim 13, wherein the access control system is configured to determine whether the object is one or more of an adult-height person, a child-height person, a person carrying an item, a person wearing a hat, a person pulling or pushing an item, a plurality of people in close proximity, a non-human animal, an occupied wheelchair, an unoccupied wheelchair, an umbrella, a person on another person's back, and/or a person crawling.

* * * * *